(12) United States Patent
Hsu

(10) Patent No.: US 11,202,022 B2
(45) Date of Patent: Dec. 14, 2021

(54) DEVICE AND METHOD FOR FORMING HIGHER RESOLUTION IMAGE OF IMAGE TARGET

(71) Applicant: Innovative Interface Laboratory Corp., Hsinchu (TW)

(72) Inventor: Yu-Wen Hsu, Taipei (TW)

(73) Assignee: SiMotors Company, Shanghai (CN)

( * ) Notice: Subject to any disclaimer, the term of this patent is extended or adjusted under 35 U.S.C. 154(b) by 0 days.

(21) Appl. No.: 17/091,258

(22) Filed: Nov. 6, 2020

(65) Prior Publication Data

US 2021/0144316 A1    May 13, 2021

Related U.S. Application Data

(60) Provisional application No. 62/931,926, filed on Nov. 7, 2019, provisional application No. 63/065,692, filed on Aug. 14, 2020.

(51) Int. Cl.
| | |
|---|---|
| *H04N 5/225* | (2006.01) |
| *H04N 5/349* | (2011.01) |
| *H04N 5/345* | (2011.01) |
| *H04N 5/369* | (2011.01) |
| *H04R 1/10* | (2006.01) |
| *H04R 3/00* | (2006.01) |
| *H04R 19/02* | (2006.01) |

(52) U.S. Cl.
CPC .......... *H04N 5/349* (2013.01); *H04N 5/3456* (2013.01); *H04N 5/379* (2018.08); *H04R 1/1008* (2013.01); *H04R 3/00* (2013.01); *H04R 19/02* (2013.01)

(58) Field of Classification Search
CPC .......... H04N 5/23232; H04N 5/23245; H04N 5/343; H04N 5/349
See application file for complete search history.

(56) References Cited

U.S. PATENT DOCUMENTS

| | | | |
|---|---|---|---|
| 6,236,430 B1* | 5/2001 | Suzuki ................. | H04N 5/2259 348/219.1 |
| 2002/0057346 A1* | 5/2002 | Hirasawa ........... | H04N 5/23296 348/207.99 |
| 2002/0097324 A1* | 7/2002 | Onuki ................ | H04N 5/23254 348/208.99 |

(Continued)

*Primary Examiner* — Twyler L Haskins
*Assistant Examiner* — Dwight Alex C Tejano
(74) *Attorney, Agent, or Firm* — Allen, Dyer, Doppelt + Gilchrist, PA

(57) ABSTRACT

An image capturing device for forming a higher resolution image of an image target having a plurality of pixel areas respectively is disclosed. The image capturing device includes an image sensor having a plurality of sensing pixels corresponding to the plurality of pixel areas respectively; an in-plane motion motor coupled to the image sensor, and configured to cause the image sensor to take a plurality of raw images related to the image target one by one; and a controller configured to synthesize the plurality of raw images into the higher resolution image, wherein: the image sensor has a sensor surface; the in-plane motion motor incrementally moves a plurality of times the image sensor, each time with a distance equal to 1/N of a pixel pitch of one of the plurality of sensing pixels, along a first direction parallel to the sensor surface to respectively capture the plurality of raw images for forming the higher resolution image; and N is a positive integer being larger than 1.

19 Claims, 24 Drawing Sheets

(56) References Cited

U.S. PATENT DOCUMENTS

| | | | |
|---|---|---|---|
| 2002/0145668 A1* | 10/2002 | Harada | H04N 5/3728 348/219.1 |
| 2005/0001906 A1* | 1/2005 | Sato | H04N 5/23287 348/208.6 |
| 2010/0103294 A1* | 4/2010 | Min | H01L 27/14627 348/273 |
| 2010/0289888 A1* | 11/2010 | Ogihara | G06T 1/00 348/79 |
| 2012/0057014 A1* | 3/2012 | Takayama | H04N 5/3532 348/79 |
| 2012/0169910 A1* | 7/2012 | Singh | H04N 5/349 348/302 |
| 2013/0083220 A1* | 4/2013 | Imade | H04N 5/262 348/239 |
| 2016/0212332 A1* | 7/2016 | Tang | G02B 26/0875 |
| 2017/0006229 A1* | 1/2017 | Ishikawa | H04N 5/2253 |
| 2019/0296062 A1* | 9/2019 | Terauchi | H04N 5/23229 |

* cited by examiner

7040

DEVICE AND METHOD FOR FORMING HIGHER RESOLUTION IMAGE OF IMAGE TARGET

CROSS-REFERENCE TO RELATED APPLICATION AND CLAIM OF PRIORITY

This application claims the benefit of the U.S. Provisional Patent Application Nos. 62/931,926, filed on Nov. 7, 2019, and 63/065,692 filed on Aug. 14, 2020 at the U.S. Patent and Trademark Office, the disclosures of which are incorporated herein in their entirety by reference.

FIELD OF THE DISCLOSURE

The present disclosure is related to an image capturing device. More specifically, the present disclosure is related to an image capturing device and a method for forming a higher resolution image of an image target.

BACKGROUND OF THE DISCLOSURE

An image capturing device, such as a camera, is an essential gadget for many people in contemporary society. Nowadays, a camera that can take pictures with high resolution or super high resolution is even more desirable. However, the mark of a good picture taken by a user depends on the resolution of the image sensor in the camera. For an image sensor with a fixed dimension, the higher the resolution it has, the smaller a pixel is. However, there is an engineering limit to the pixel dimension/pixel pitch when the image sensor is produced. For example, when an image sensor having the pixel pitch of 12 micrometers and a resolution of 640×480 (or having 300,000 pixels) is produced, the area of the active area of the image sensor will be 7.68 cm×5.76 cm. Therefore, for an image sensor having the same size, the resolution of 640×480 is reaching an upper limit. There is no way to improve the resolution of the image sensor based on the prior art.

Therefore, the Applicant has disclosed an image capturing device to geometrically increase the resolution of an image sensor having a current resolution, and provide an image capturing device with integrated and compact design and a method of making same. In addition, the image capturing device can also be equipped with an auto-focus device for obtaining an on-focus image from a target image.

SUMMARY OF THE DISCLOSURE

In accordance with one aspect of the present disclosure, an image capturing device for forming a higher resolution image of an image target having a plurality of pixel areas respectively is disclosed. The image capturing device comprises an image sensor having a plurality of sensing pixels corresponding to the plurality of pixel areas respectively; an in-plane motion motor coupled to the image sensor, and configured to cause the image sensor to take a plurality of raw images related to the image target one by one; and a controller configured to synthesize the plurality of raw images into the higher resolution image, wherein: the image sensor has a sensor surface; the in-plane motion motor incrementally moves a plurality of times the image sensor, each time with a distance equal to 1/N of an pixel pitch of one of the plurality of sensing pixels, along a first direction parallel to the sensor surface to respectively capture the plurality of raw images for forming the higher resolution image; and N is a positive integer being larger than 1.

In accordance with another aspect of the present disclosure, an image capturing device for capturing a plurality of raw images for forming a higher resolution image of an image target is disclosed. The image capturing device comprises an image sensor having a plurality of sensing pixels having a pixel pitch, and configured to capture the plurality of raw images; and an in-plane motion motor coupled to the image sensor, and configured to: cause the image sensor to incrementally move a plurality of times, each time with a distance equal to 1/N of the pixel pitch and to capture the plurality of raw images one by one, wherein N is a positive integer being larger than 1.

In accordance with another aspect of the present disclosure, a method of capturing a plurality of raw images for forming a higher resolution image of an image target is disclosed. The method comprises providing an image sensor having a plurality of sensing pixels having a pixel pitch; causing the image sensor to capture a first one of the plurality of raw images of the image target; and respectively capturing the other ones of the plurality of raw images by sequentially moving the image sensor incrementally, each time with a distance equal to 1/N of the pixel pitch, wherein N is a positive integer being larger than 1.

The above objectives and advantages of the present disclosure will become more readily apparent to those ordinarily skilled in the art after reviewing the following detailed descriptions and accompanying drawings, in which:

DETAILED DESCRIPTION OF THE EMBODIMENTS

The present disclosure will now be described more specifically with reference to the following embodiments. It is to be noted that the following descriptions of embodiments of the present disclosure are presented herein for the purposes of illustration and description only; they are not intended to be exhaustive or to be limited to the precise form disclosed.

Apparatus Having in-Plane and Out-of Motions

Figure 1:
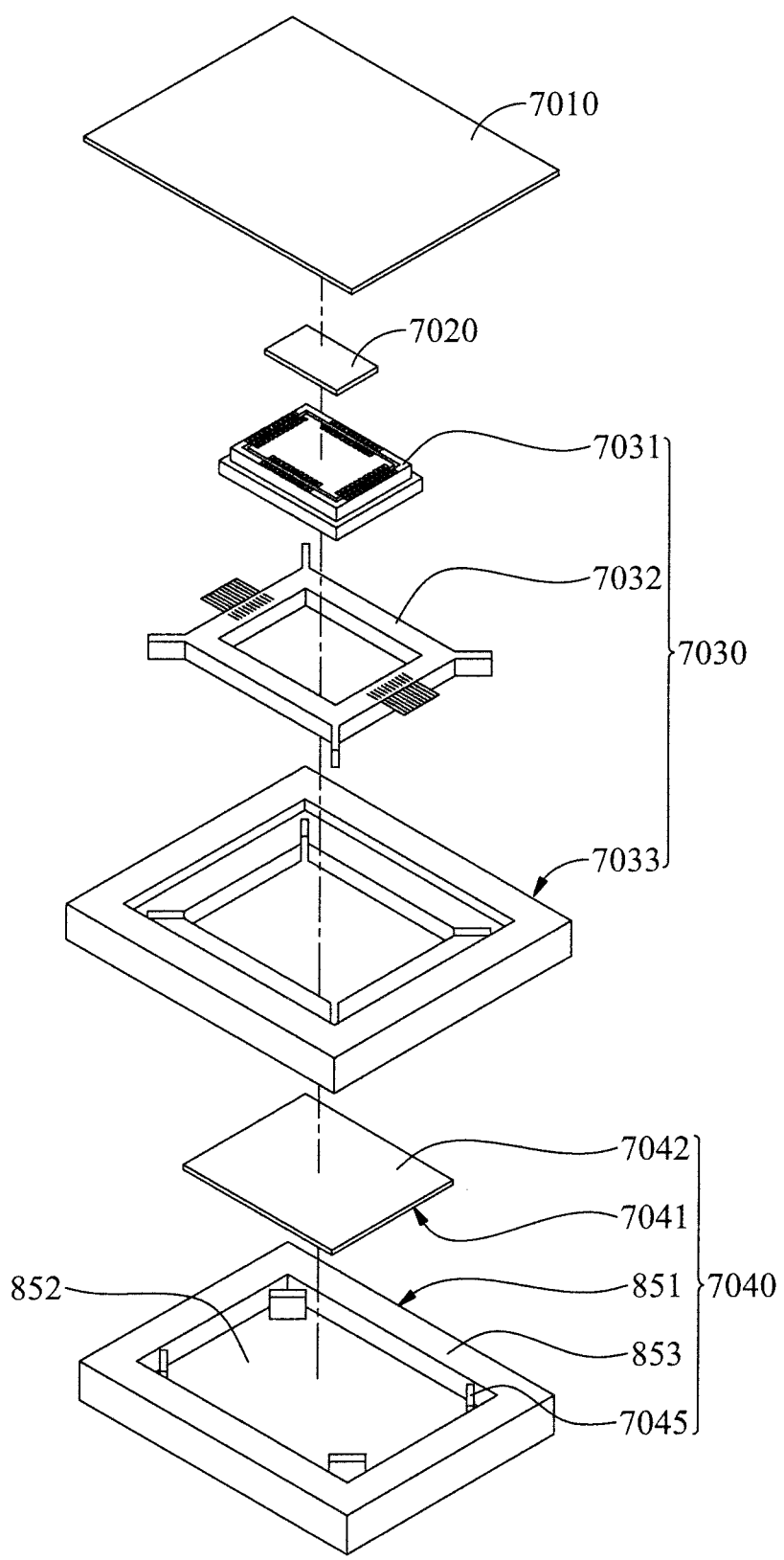
FIG. 1 is a schematic exploded view drawing showing a light sensing apparatus according to one embodiment of the present invention.

FIG. 1 is a schematic exploded drawing showing a light sensing apparatus according to one embodiment of the present invention. As shown in FIG. 1, the image sensing apparatus 7000 includes an in-plane motion motor 7030 and an out-of plane motion motor 7040. The in-plane motion motor 7030 provides a function capable of incrementally moving a functional device 7020 in a reference plane that the functional device 7020 lies in. The out-of-plane motion motor 7040 provides a function capable of moving the functional device 7020 by at least one single-axis motion motor 7045 in a direction vertical to the plane that the functional device 7020 lies in. The functional device 7020 can be a sensor configured for a sensing function, a mirror configured for a scanning function, or an additional filter configured for a filtering function. In case the functional device 7020 is a sensor configured for sensing a light or an image, the sensor can be a CMOS sensor used in a camera or an image sensor, for example. In the case that the functional device 7020 is applied to the image sensing apparatus 7000 and moved by two or three single-axis motion motors 7045, the plane that the functional device 7020 lies in can be tilted. In the case when the functional device 7020 is moved by four single-axis motion motors 7045, the plane that the functional device 7020 lies in can additionally be vertically moved, pitched and/or rolled. A lead frame 7032 is required to accommodate and electrically connect to the in-plane motion actuator 7031 through a first set of wires (not shown). The image sensing apparatus 7000 can further includes an application device 7010 being a filter or a lens for allowing a light having wavelengths within a predetermined range to pass therethrough. The functional device 7020 is selected depending on the application function required for the application device 7010.

Figure 2:
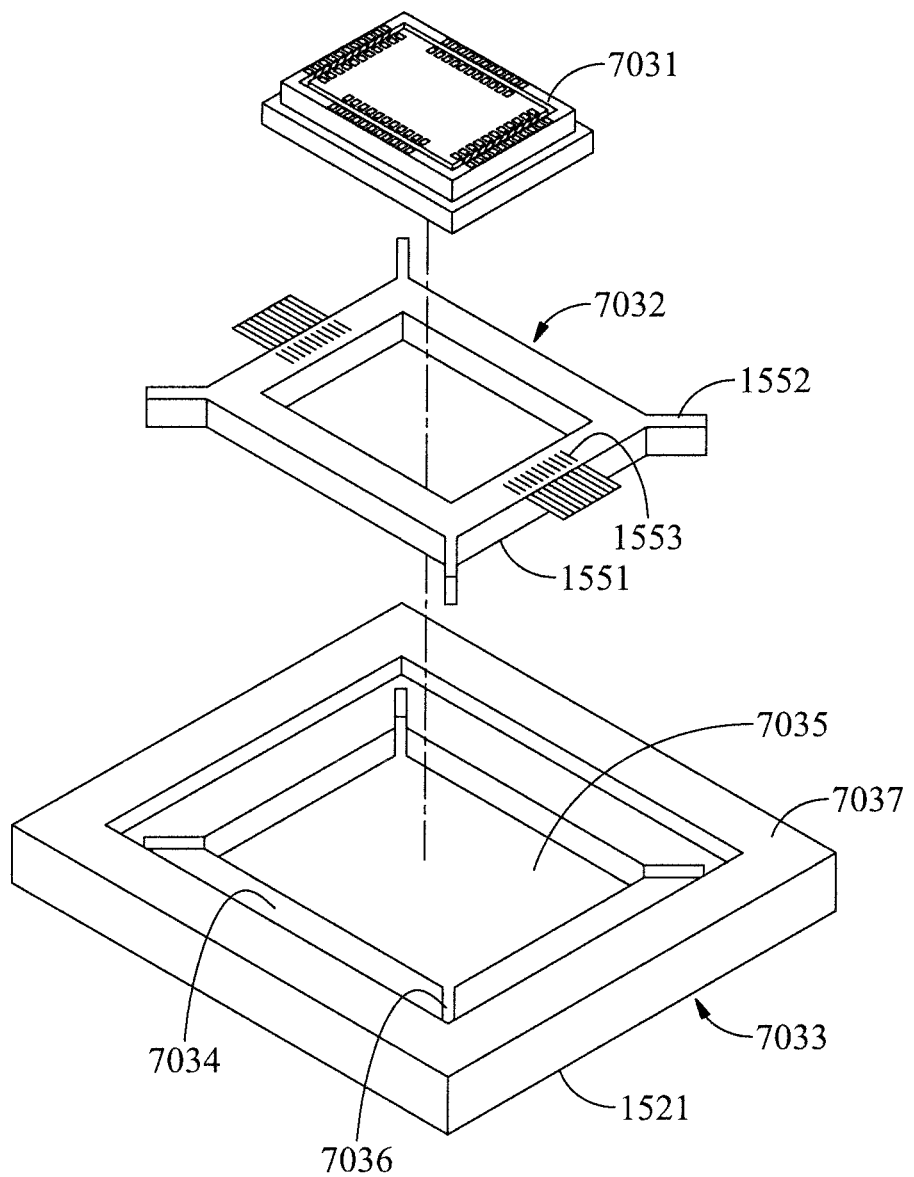
FIG. 2 is a schematic drawing showing an in-plane motion motor according to one embodiment of the present invention.
Figure 3:
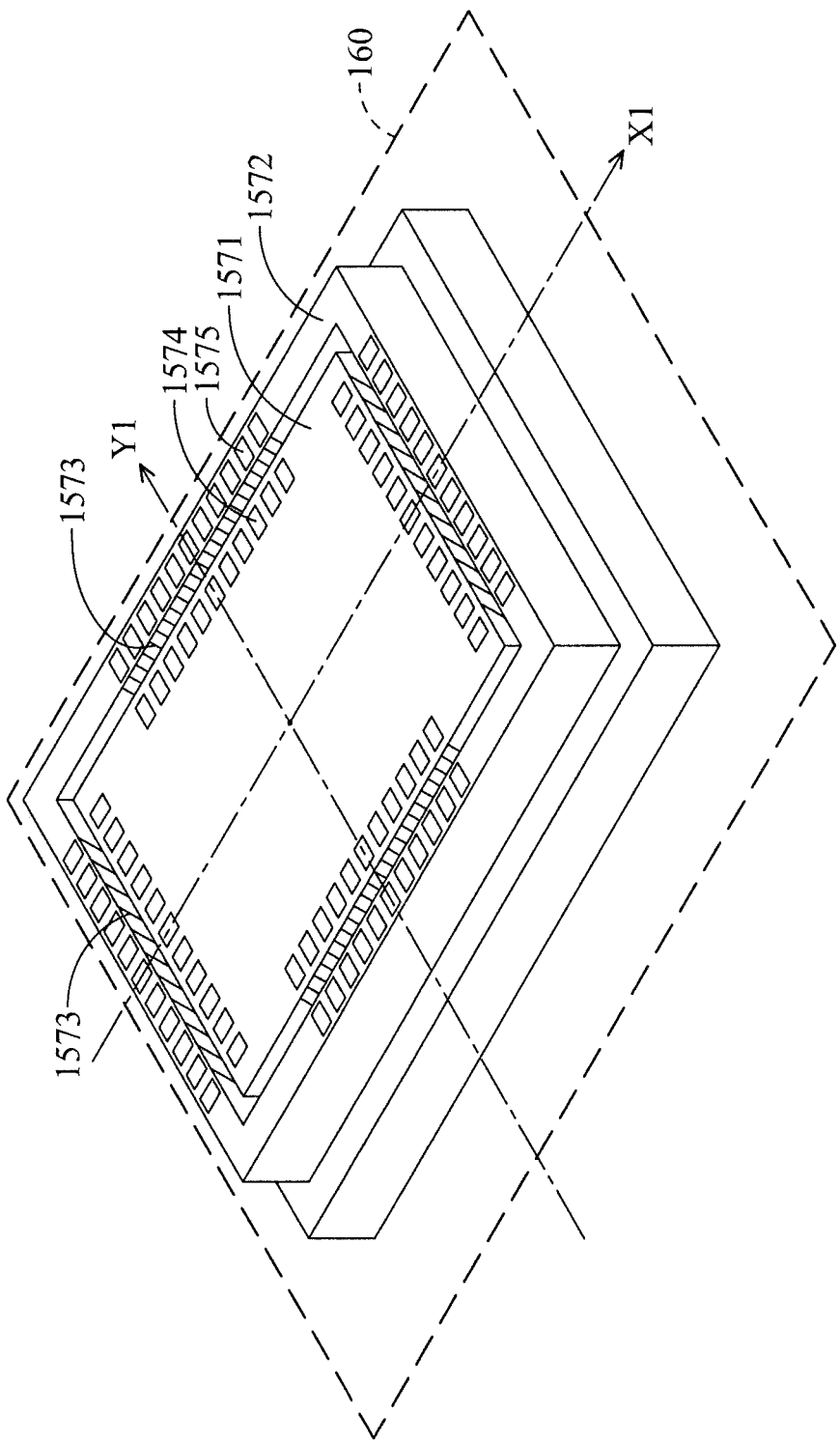
FIG. 3 is a schematic drawing showing in-plane motion actuator according to one embodiment of the present invention.

FIG. 2 is a schematic drawing showing an in-plane motion motor according to one embodiment of the present invention. FIG. 3 is a schematic drawing showing an in-plane motion actuator according to one embodiment of the present invention. As shown in FIGS. 2 and 3, the in-plane motion motor 7030 includes a first circuit board 7033 having a first bottom base 1521 with a central cavity 7035 and a first circuit board frame 7037 disposed thereon, a lead frame 7032 disposed inside the central cavity 7035, and an in-plane motion actuator 7031 having a movable inner frame 1571 and a fixed outer frame 1572. The surfaces of both of the movable inner frame 1571 and the fixed outer frame 1752 are allocated in a reference plane 160, wherein the movable inner frame 1571 moves along at least one of two directions X1 and Y1 perpendicular to each other in the reference plane 160 and parallel to the first bottom surface 1521 of the first bottom base 7034. The in-plane motion actuator 7031 is disposed inside the lead frame 7032, and the functional device 7020 is disposed on the in-plane motion actuator 7031. If the in-plane motion motor 7030 is assembled in the light sensing apparatus 7000 according to one embodiment of the present invention, the structure of the first circuit board 7033 cooperates with and fits to the structure of the out-of-plane motion motor 7040.

As shown in FIGS. 1-3, four sets of the connecting elements 1573 are installed at the periphery of the movable inner frame 1571, and between the movable inner frame 1571 and the fixed outer frame 1572. Each of the four sets of the connecting elements 1573 can be a set of soft electrical linkages (SELs) mechanically connecting the movable inner frame 1571 to the fixed outer frame 1572, and electrically connecting the bonding pads 1574 on the movable inner frame 1571 to the bonding pads 1575 on the fixed outer frame 1572, directly or indirectly. In another embodiment according to the present invention, each of the four sets of the connecting elements 1773 can be integrated into a flexible circuit board mechanically connecting the movable inner frame 1571 to the fixed outer frame 1572 and electrically as well as thermally connecting the bonding pads 1574 on the movable inner frame 1571 to the bonding pads 1575 on the fixed outer frame 1572, directly or indirectly. In this case, in addition to the purposes of the electric conduction, the flexible circuit board can further transfer and dissipate the heat generated from the functional device 7020 to a heat sink disposed on the base plate 851 through the flexible circuit board, and the circuits (not shown) as well as the wire connections (not shown) disposed between the functional device 7020 and the base plate 851, to prevent the functional device 7020 from overheating during operation.

In addition, as shown in FIGS. 1-3, the lead frame 7032 has four flexible hinges 1552 each of which is located at one of the four corners, and is to be fixed to one of four notches 7036 arranged on the four corners in the central cavity 7035 of the bottom base 7034 of the first circuit board 7033 by a process such as welding. Each of the four flexible hinges 1552 provides a feasibility of moving the lead frame 7032 vertical to the plane that the functional device 7020 lies in, so that the lead frame 7032 is free from the first bottom surface 1521 of the first circuit board 7033 when it is actuated by at least one of the four single-axis motion motors 7045. The functional device 7020 is fixed on the movable inner frame 1571 of the in-plane motion motor 7030. The signal I/O pads (not shown) of the functional device 7020 are wired and electrically connected to the bonding pads 1574 on the movable inner frame 1571. The bonding pads 1575 on the fixed outer frame 1572 of the in-plane motion actuator 7031 are wired and electrically connected to the bonding pads 1553 on the lead frame 7032 by bonding a first set of wires (not shown) therebetween. The bonding pads 1553 on the lead frame 7032 are wired and electrically connected to the bonding pads (not shown) on the first circuit board 7033 by bonding a second set of wires therebetween. The bonding pads 1575 on the fixed outer frame 1572, the bonding pads 1574 on the movable inner frame 1571, and the bonding pads 1553 on the lead frame 7032, and the bonding pads (not shown) on the first circuit board 7033 are designed as required. The wire connections (not shown) between different bonding pads, such as those between the functional device 7020 and the movable inner frame 1571 and between the fixed outer frame 1572 and the lead frame 155 are for providing signals and bias for control needs. The wire connections can be done by a bonding process with an assistance of a jig or tooling properly designed.

In-plane motion motor including an in-plane motion actuator having a built-in single-axis actuator (Type 1)

Figure 4:
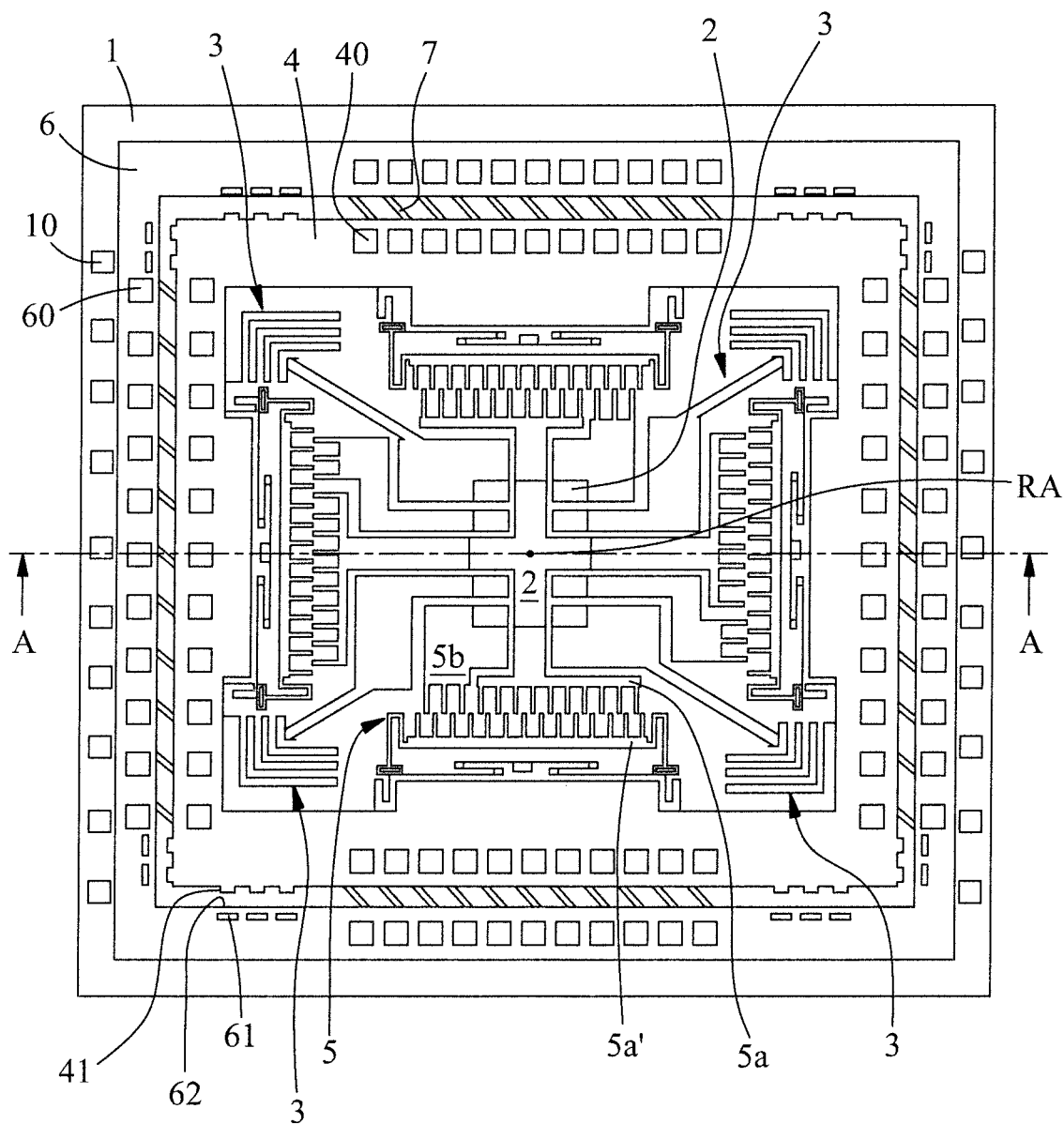
FIG. 4 is a top view of a micro-electromechanical actuator according to an embodiment of the present invention.
Figure 5:
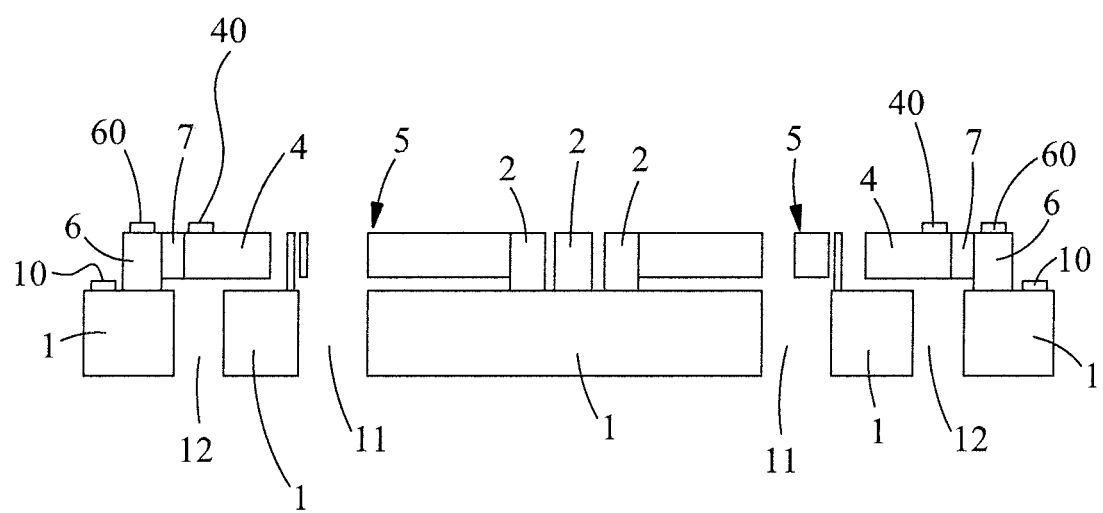
FIG. 5 is a cross-sectional view of FIG. 4 along the dotted line AA.

Please refer to FIGS. 4 and 5 simultaneously, wherein FIG. 4 is a top view of a micro-electromechanical actuator according to an embodiment of the present invention, and FIG. 5 is a cross-sectional view of FIG. 4 along the dotted line AA. The micro-electromechanical actuator includes a substrate 1, a first frame 4, and a second frame 6. The first frame 4 and the second frame 6 are formed on the substrate 1, and the second frame 6 surrounds the first frame 4. The first frame 4 serves as a supporting structure, and the second frame 6 serves as a peripheral structure. The first frame 4 serves as a movable element, and is connected to a fixing portion 2 via resilient elements 3. The fixing portion 2 can be an anchor which is connected to the substrate 1. It can be clearly seen in FIG. 4 that the present invention adopts a central fixing portion (anchor) structure, and each resilient element 3 is connected to four corners of the first frame 4. Therefore, when the resilient elements 3 suffer the compressing force, the restoring force thereof is applied to the corners of the first frame 4, thereby expand the first frame 4 to maintain the original shapes of edges of the first frame 4, which are usually perfectly straight. The present invention further includes four micro-electromechanical actuator units 5. Each micro-electromechanical actuator unit has a first comb finger unit 5a fixed on the anchor 2, i.e. indirectly fixed on the substrate 1. Each micro-electromechanical actuator unit 5 further includes a first counter comb finger unit 5a' fixed on the first frame 4. That is, the first comb finger unit 5a and the first counter comb finger unit 5a' are disposed in pairs. The comb fingers of the first comb finger unit 5a directly face the finger slits of the first counter comb finger unit 5a'. Similarly, the comb fingers of the first counter comb finger unit 5a' directly face the finger slits of the first comb finger unit 5a. When the electrostatic force is generated, the first comb finger unit 5a and the first counter comb finger unit 5a' attract each other so that the comb fingers of the first comb finger unit 5a and those of the first counter comb finger unit 5b' are staggered. The first comb finger unit 5a and the first counter comb finger unit 5a' serve as an actuating unit. For the lower micro-electromechanical actuator unit 5, when the electrostatic force is generated through electrifying, the first comb finger unit 5a and the first counter comb finger unit 5a' attract each other, thereby causing the first frame 4 to move upward. In addition, because the electrostatic force passes through a center point RA of the first frame 4, the first frame 4 does not rotate. For the same reason, when the upper micro-electromechanical actuator unit 5 is electrified to generate the electrostatic force, the first frame 4 moves downward; when the left micro-electromechanical actuator unit 5 is electrified to generate the electrostatic force, the first frame 4 moves to the right; and when the right micro-electromechanical actuator unit 5 is electrified to generate the electrostatic force, the first frame 4 moves to the left. Moreover, the micro-electromechanical actuator unit 5 further includes a sensing comb finger unit 5b. The sensing comb finger unit 5b is located opposite the first counter comb finger unit 5a' to sense the capacitance value between the first counter comb finger unit 5a' and the sensing comb finger unit 5b when the first frame 4 moves. Then, the capacitance value is converted to the distance between the first counter comb finger unit 5a' and the sensing comb finger unit 5b, thereby confirming the distance that the first frame 4 moves. The sensing comb finger unit 5b and the first counter comb finger unit 5a' serve as another actuating unit, and the first counter comb finger unit 5a' serves as a position sensing capacitor. In addition, the first frame 4 usually serves as a carrier, on which an electronic element (not shown) is fixed. Therefore, for electrical connection, a plurality of bonding pads 40 are further disposed on the first frame 4. For the same reason, the substrate 1 also has a plurality of bonding pads 10, and the second frame 6 also has a plurality of bonding pads 60. The purposes of the bonding pads 40, 10, 60 will be illustrated in FIGS. 6A and 6B. Furthermore, in order to electrically connect the first frame 4 with the second frame 6, and also to enable the first frame 4 to move freely in the second frame 6, the first frame 4 is electrically connected to the second frame 6 via a plurality of flexible elements 7. Each flexible element 7 is formed together with the first frame 4 and the second frame 6, and usually mainly composed of silicon with a conductive metal layer in between. When viewed from above, each flexible element 7 is roughly zigzag from left to right, but its thickness is roughly identical to that of the first frame 4. Through a larger thickness of each flexible element 7, the effect of immunity in the Z-axis direction is achieved. In addition, please see the lower left corners of the first frame 4, the second frame 6, and the substrate 1. In the present invention, in order to prevent the first frame 4 and the second frame 6 from being damaged due to accidental shaking, excessive displacement distance, and other uncertain conditions, a spacer 41 is disposed on the first frame 4. The spacer 41 is usually a protrusion to prevent the first frame 4 and the second frame 6 from being too close to cause the flexible elements 7 to be excessively squeezed. Through the spacer 41, a gap can remain between the first frame 4 and the second frame 6. In addition, in order to absorb the impact force, a cushion 62 is further disposed on the second frame 6 at the position corresponding to the spacer 41. The cushion is formed via a cushioning space 61 on the second frame 6. The cushioning space 61 is a through hole so that the cushion 62 can be formed. Therefore, when the spacer 41 hits the cushion 62, the material at the position of the cushion 62 can be appropriately deformed toward the cushion space 61 to absorb the impact force.

Please refer to FIG. 5, which is a cross-sectional view of FIG. 4 along the dotted line AA. As shown in FIG. 5, the substrate 1 has cavities, whose positions can be under the micro-electromechanical actuator unit 5, or under both of the first frame 4 and the flexible elements 7, or under all of the micro-electromechanical actuator unit 5, the first frame 4, and the flexible elements 7. For ease of description, the cavity located under the micro-electromechanical actuator unit 5 is referred to as a first cavity 11, and the cavity located under both the first frame 4 and the flexible elements 7 is referred to as a second cavity 12. Moreover, in order to achieve the effect of eliminating the waste materials and residues after etching, for the first cavity 11, the upward (i.e. toward the first frame 4) projecting area thereof at least partially covers the micro-electromechanical actuator unit 5. In addition, each side of the upward projecting area of the first cavity 11 can overlap each side of the area occupied by all comb fingers of the micro-electromechanical actuator unit 5, or the perimeter of the upward projecting area of the first cavity 11 is slightly larger or smaller than that of the area occupied by all comb fingers of the micro-electromechanical actuator unit 5. For the same reason, the upward (i.e. toward the first frame 4) projecting area of the second cavity 12 at least partially covers the flexible elements 7 and the first frame 4. Furthermore, each side of the upward projecting area of the second cavity 12 can overlap each side of the area occupied by all flexible elements 7 at a certain side of the first frame 4, or the perimeter of the upward projecting area of the second cavity 12 is slightly larger or smaller than that of the area occupied by all flexible elements 7 at the certain side of the first frame 4. As mentioned above, due to the miniaturization of the size of the comb finger, the width of the finger slit between the comb fingers is very small. In addition, when the first comb finger unit 5a and the first counter comb finger unit 5a' are staggered, the space at the finger slit of the first comb finger unit 5a becomes even narrower because a large part thereof is taken up by the first counter comb finger unit 5a anical actuator unit 5, or under both of the first counter comb finger unit 5a' also becomes even narrower because a large part thereof is taken up by the first comb finger unit 5a. Due to the existence of the first cavity 11, the waste materials and residues after etching the comb fingers will fall into the first cavity 11 and then be discharged, or at least stay in the first cavity 11 and away from the comb fingers. This enables the probability of the waste materials and residues staying between the finger slits or between the comb fingers and the substrate to be greatly reduced so that the production yield is greatly enhanced. For the same reason, because each flexible element 7 must be quite flexible, i.e. very easy to be stretched and squeezed, and its elastic restoring force is extremely low so as not to affect the movement of the first frame 4, the structure of each flexible element 7 is also extremely small. Therefore, the gap between the zigzag structures of two adjacent flexible elements 7 is also very narrow. If the waste materials and residues after etching remain, the softness of each flexible element 7 will be greatly reduced. Hence, through the disposition of the second cavity 12 of the present invention, the waste materials and residues after etching the flexible elements 7 will fall into the second cavity 12 and then be discharged, or at least stay in the second cavity 12 and away from the flexible elements 7. This enables the probability of the waste materials and residues staying in the gap between the zigzag structures of two adjacent flexible elements 7 or between each flexible element 7 and the substrate 1 to be greatly reduced so that the production yield is greatly enhanced. Furthermore, the bonding pads 10, 40, 60 are disposed on the substrate 1, the first frame body 4, and the second frame body 6 respectively. The purposes of the bonding pads 10, 40, 60 will be illustrated in FIGS. 6A and 6B.

Figure 6A:
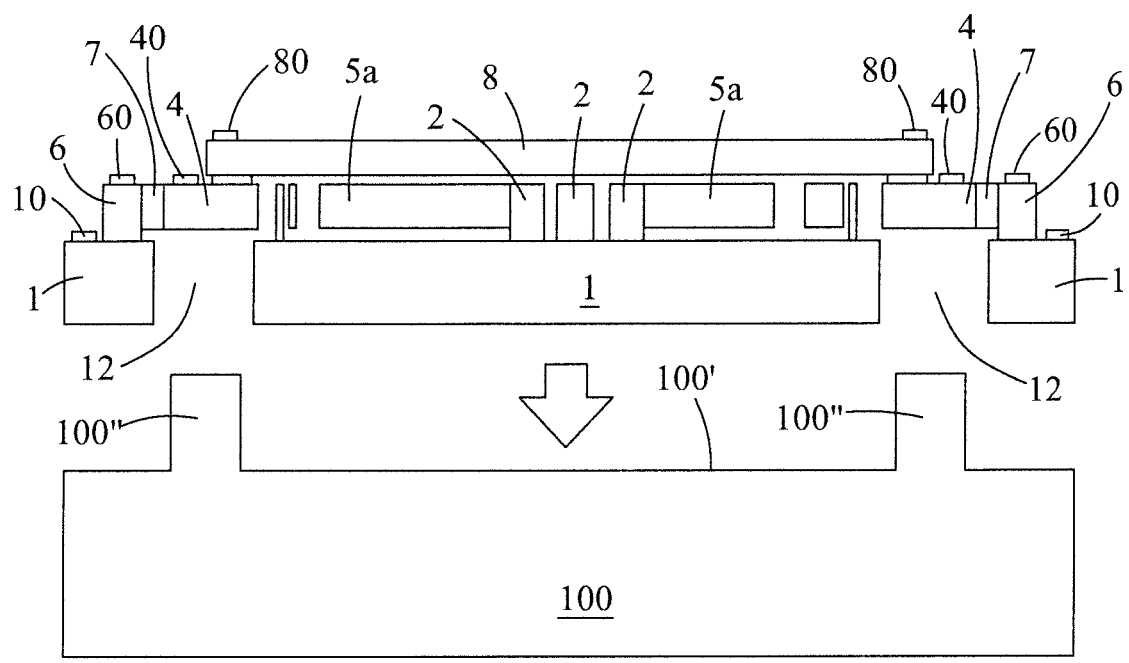
FIGS. 6A and 6B show the assembling state of the present invention.
Figure 6B:
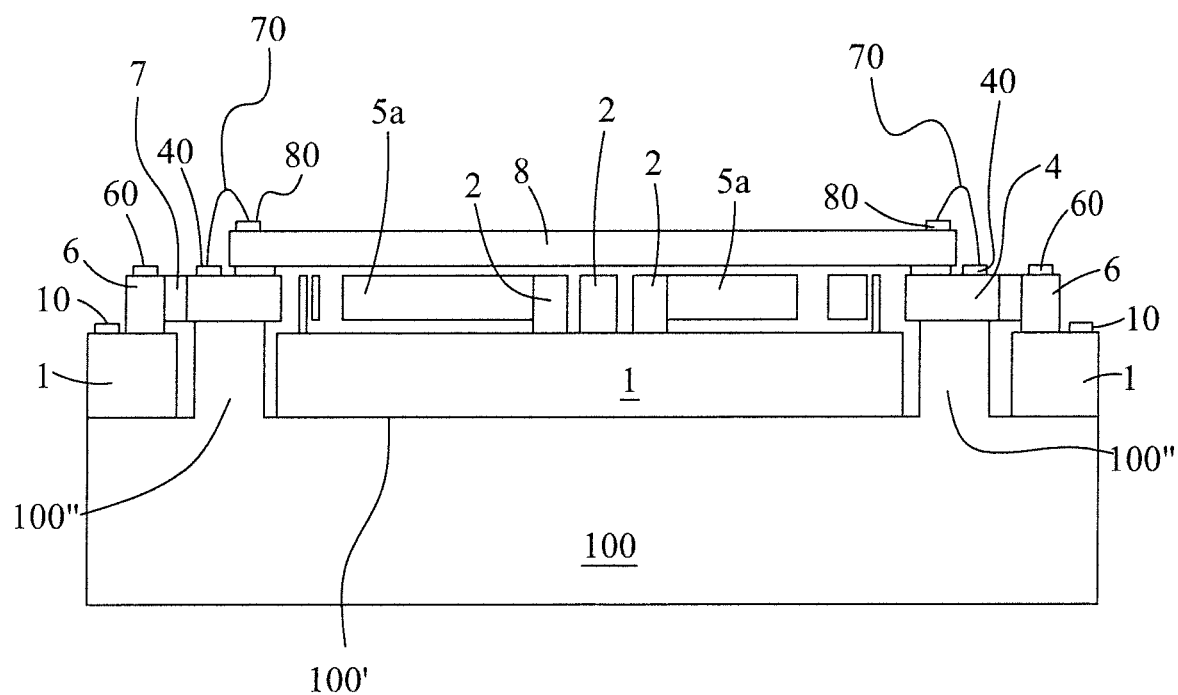

Please refer to FIGS. 6A and 6B, which show the assembling state of the present invention. The first comb finger units 5a of the micro-electromechanical actuator units 5 (please refer to FIG. 4) are all fixed on the substrate 1 via the anchor 2. In order to avoid assembling failure or even structural damage due to the shaking of the first frame 4 during the assembling of the electronic element 8 and the wire bonding 70, a supporting body 100 is used as a jig. Supporting protrusions 100" of the supporting body 100" pass through the second cavity 12 to support the first frame 4, and the substrate 1 is directly placed on the supporting surface 100'. In this way, the stability of the overall structure during the assembling of the electronic element 8 and the wire bonding 70 can be ensured. Through the wire bonding 70, the bonding pads 80 are electrically connected to the bonding pads 40 of the first frame 4. In this way, signals of the electronic element 8 can be transmitted outwards, or external commands can be transmitted into the electronic element 8. Moreover, the bonding pads 40 are electrically connected to the bonding pads 60 via the flexible elements 7, the bonding pads 60 are electrically connected to the bonding pads 10 via the wire bonding process, and then the bonding pads 10 are electrically connected to the outside. For the sake of simplicity of the drawings, the first cavity 11 in FIG. 5 is not drawn in FIGS. 6A and 6B.

Figure 7:
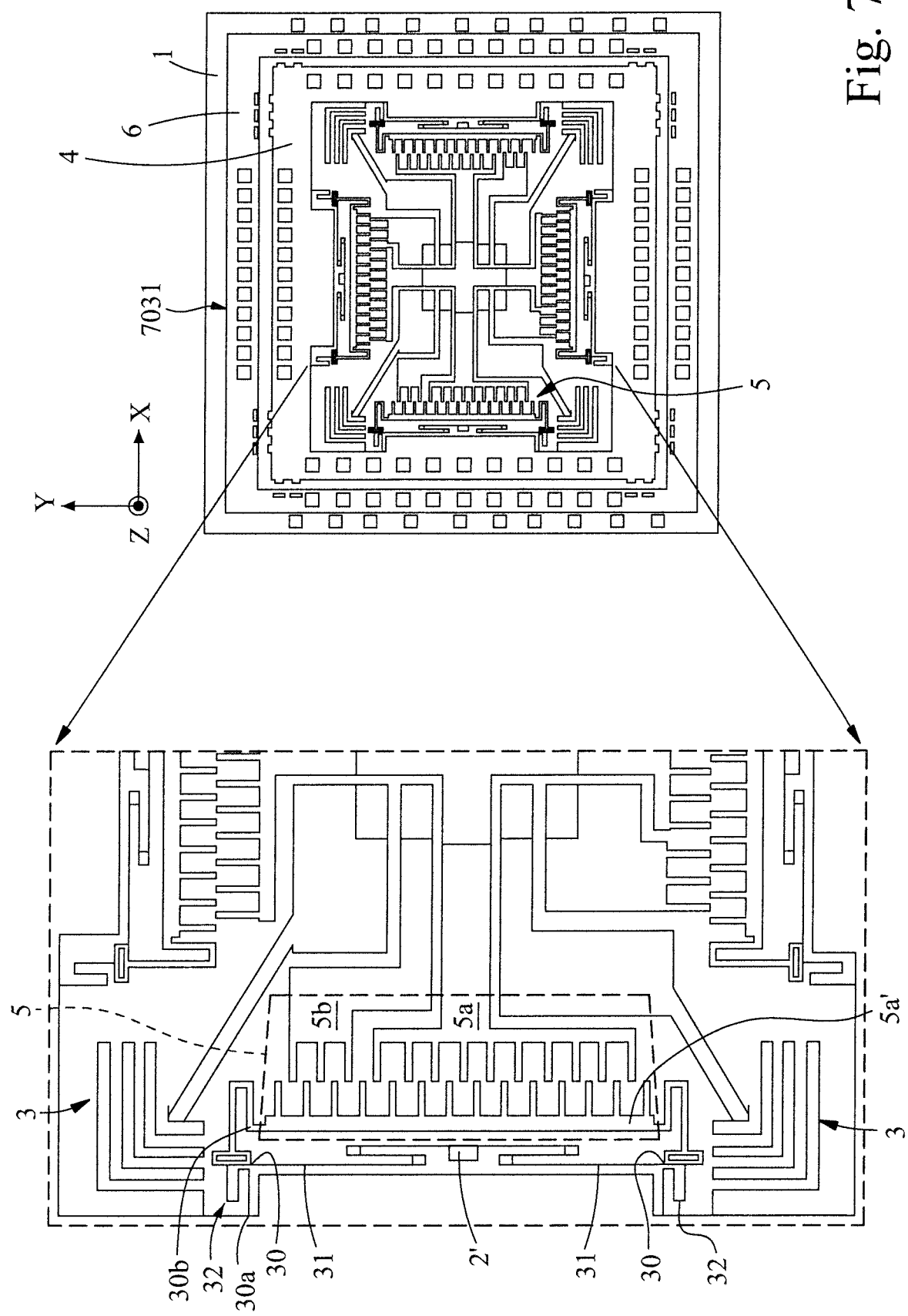
FIG. 7 is a partially enlarged view of FIG. 4.

Please refer to FIG. 7, which is a partially enlarged view of FIG. 4. FIG. 7 mainly shows the left micro-electromechanical actuator unit 5 of the entire device in FIG. 4 and its surrounding elements. The first comb finger unit 5a of the micro-electromechanical actuator unit 5 is fixed on the anchor 2, and the first counter comb finger unit 5a' is fixed on the first frame body 4 and corresponding to the first comb finger unit 5a. As for the sensing comb finger unit 5b, it is located opposite to the first counter comb finger unit 5a'. The effects of the above comb finger units 5a, 5a', 5b are not repeated here. Because the first frame 4 of this embodiment can move up and down or left and right, it is possible that the first counter comb finger unit 5a' collides with the first comb finger unit 5a and the sensing comb finger unit 5b, thereby causing damage. In order to avoid this phenomenon, in the present invention, a constraint anchor 2' (constraint fixing portion) and a constraint hinge 31 are disposed near each micro-electromechanical actuator unit 5, and a decoupling hinge 32 is disposed between the first frame 4 and the first counter comb finger unit 5a'. The decoupling hinge 32 is fixed to the constraint hinge 31 via a decoupling point 30. Take FIG. 7 as an example, the first counter comb finger unit 5a' is only allowed to move left and right, i.e. moving parallel to the forward and reverse directions of the X-axis, and moving forward and reversely along the finger direction of the first counter comb finger unit 5a'. Moreover, the first counter comb finger unit 5a' must be immune to the movement parallel to the Y-axis direction, i.e. not moving in the arranging direction of the first counter comb finger unit 5a'. Similarly, the right micro-electromechanical actuator unit 5 of the entire device in FIG. 4 operates in the same way. That is, the micro-electromechanical actuator unit 5 which controls the first frame 4 to move left and right must be immune to the Y-axis direction. Furthermore, the micro-electromechanical actuator unit 5 which controls the first frame 4 to move up and down, i.e. the upper and lower micro-electromechanical actuator units 5 in FIG. 4, must be immune to the X-axis direction. Therefore, the constraint hinge 31 must be immune to the arranging direction of the first counter comb finger units 5a'. According to FIG. 7, the arranging direction of the first counter comb finger units 5a' is an up-and-down arranging direction. However, because the first counter comb finger unit 5a' must be able to move horizontally along the finger direction of the first counter comb finger unit 5a', i.e. moving left and right or in the X-axis direction according to the left micro-electromechanical actuator unit 5 in FIG. 7, the constraint hinge 31 must be able to generate the elastic deformation along the finger direction of the first counter comb finger unit 5a'. Thus, the anchor T must be as far away from the decoupling point 30 as possible. For the upper and lower decoupling points 30 for the first counter comb finger unit 5a' in FIG. 7, the midpoint thereof is the position where the constraint anchor 2' is disposed. The upper decoupling point 30, the lower decoupling point 30, and the constraint anchor 2' are aligned in a straight line parallel to the arranging direction of the first counter comb finger unit 5a' (the Y-axis direction). Hence, the size of the constraint hinge 31 in the finger direction of the first counter comb finger unit 5a' (the X-axis direction) is extremely short. This causes the constraint hinge 31 to have an extremely high rigidity in the direction parallel to the arranging direction of the first counter comb finger unit 5a' (the Y-axis direction). Therefore, when the first frame 4 moves up or down, the constraint hinge 31 can pull the decoupling point 30 tight without moving, and only the decoupling hinge 32 bends under the driving of the first frame 4. However, because the upper and lower decoupling points 30 are at a considerable distance from the constraint anchor 2' in the Y-axis direction, the constraint hinge 31 has considerable elasticity in the X-axis direction. Hence, when the first counter comb finger unit 5a' moves along the finger direction, the constraint hinge 31 can be pulled by the decoupling point 30 and bent. For the same reason, for the decoupling hinge 32, because it needs to bend in the direction parallel to the arranging direction of the first counter comb finger unit 5a', it needs to have a longer characteristic length in the direction parallel to the finger direction of the first counter comb finger unit 5a' to increase the elasticity. Oppositely, the decoupling hinge 32 cannot bend in the direction parallel to the finger direction of the first counter comb finger unit 5a', so its characteristic length in the direction parallel to the arranging direction of the first counter comb finger unit 5a' must be very short. That is, the connecting point between the decoupling hinge 32 and the first frame 4, the connecting point between the decoupling hinge 32 and the first counter comb finger unit 5a', and the decoupling point 30 are aligned in a straight line parallel to the finger direction of the first counter comb finger unit 5a' so that the decoupling hinge 31 can be immune to the bending generated by receiving the force parallel to the finger direction of the first counter comb finger unit 5a'. Therefore, when the first relative counter finger 5a' is pulled to the right, the decoupling hinge 32 can be pulled to the right by the first relative counter finger 5a' without deformation so that the transmission of the pulling force is not delayed, or the pulling force will not be absorbed due to the deformation of the decoupling hinge 32.

Please continue to refer to FIG. 7. In order to appropriately increase the bending ability of the constraint hinge 31 in the direction parallel to the finger direction of the first counter comb finger unit 5a', i.e. the flexibility, the constraint hinge 31 has a folded structure. However, the folded structure of the constraint hinge 31 is still fixed to the constraint anchor 2' and the decoupling point 30 in the direction parallel to the arranging direction of the first counter comb finger unit 5a'. For the same reason, in order to appropriately increase the bending ability of the decoupling hinge 31 in the direction parallel to the arranging direction of the first counter comb finger unit 5a', i.e. the flexibility, the decoupling hinge 31 also has a folded structure. However, the folded structure of the decoupling hinge 31 is still fixed to the decoupling point 30 and the first frame 4 in the direction parallel to the finger direction of the first counter comb finger unit 5a'.

Figure 8:
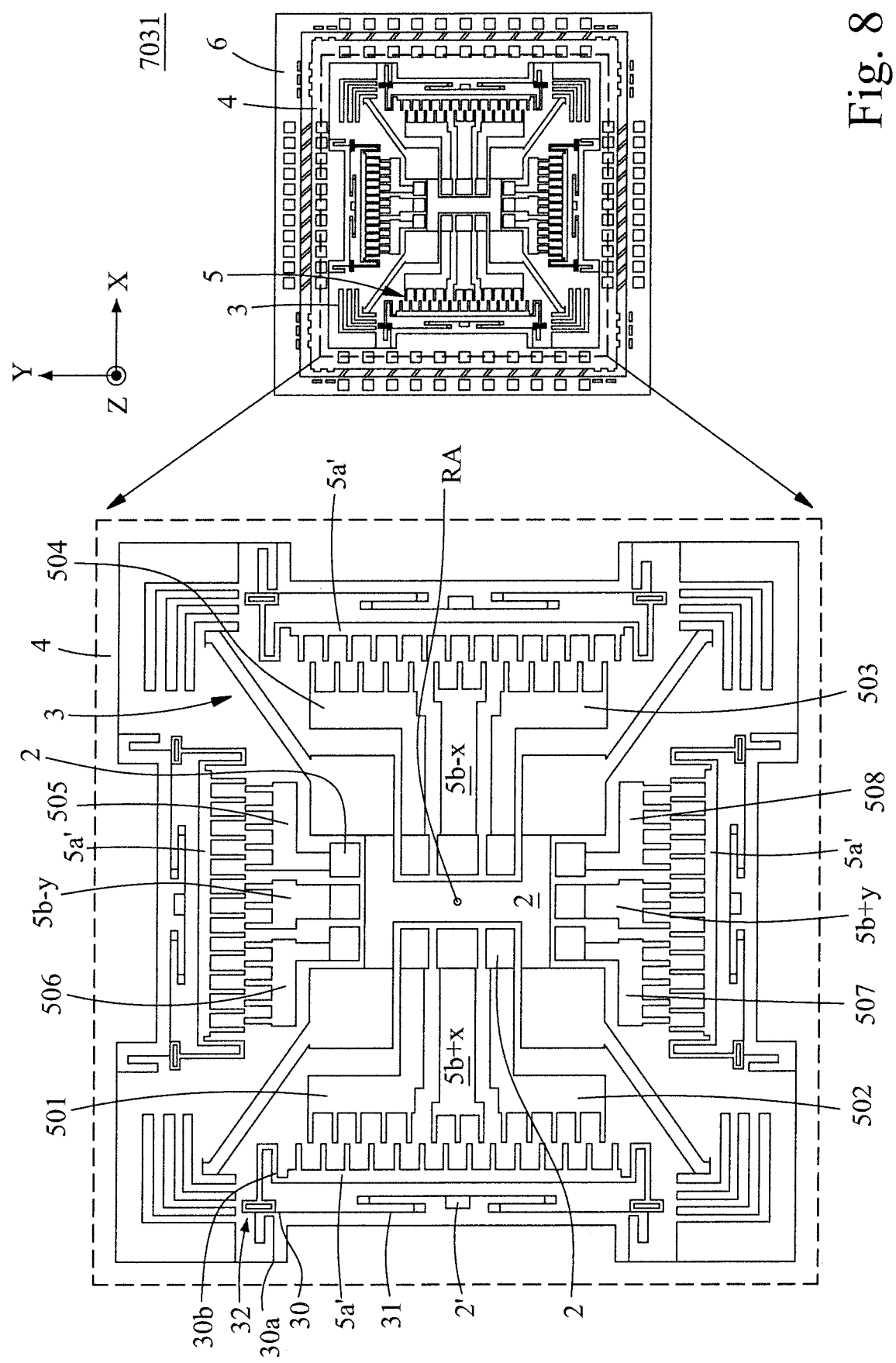
FIG. 8 is a top view of a micro-electromechanical actuator according to another embodiment of the present invention.

Please refer to FIG. 8, which is a top view of a micro-electromechanical actuator according to another embodiment of the present invention. As shown in FIG. 8, the micro-electromechanical actuator has a plurality of micro-electromechanical actuator units 5, and each micro-electromechanical actuator unit 5 has a plurality of comb finger structures. First, for the X-axis direction, a first comb finger unit 501, a second comb finger unit 502, a third comb finger unit 503, and a fourth comb finger unit 504 are connected to an anchor 2. A positive X-axis direction sensing comb finger unit 5b+x is disposed between the first comb finger unit 501 and the second comb finger unit 504, and a negative X-axis direction sensing comb finger unit 5b-x is disposed between the third comb finger unit 503 and the fourth comb finger unit 504. All comb finger units 501, 502, 503, 504, 5b+x, 5b-x are fixed to a substrate via the anchor 2 (please refer to FIG. 5). It can be seen in FIG. 8 that the electrostatic force directions of the first comb finger unit 501, the second comb finger unit 502, the third comb finger unit 503, and the fourth comb finger unit 504 all do not pass through the center point RA (rotating axis). However, because the first comb finger unit 501 and the second comb finger unit 502 are symmetrically disposed, the resultant force of the respective electrostatic forces of the first comb finger unit 501 and the second comb finger unit 502 passes through the center point RA. Similarly, because the third comb finger unit 503 and the fourth comb finger unit 504 are also symmetrically disposed, the resultant force of the respective electrostatic forces of the third comb finger unit 503 and the fourth comb finger unit 504 also passes through the center point RA. Therefore, when intending to enable the first frame 4 to move toward the positive direction of the X-axis, the first comb finger unit 501 and the second comb finger unit 502 simultaneously generate electrostatic forces to attract the first counter comb finger unit 5a'. At the same time, an inductive capacitance is generated between the positive X-axis direction sensing comb finger unit 5b+x and the first counter comb finger unit 5a' so that the moving distance of the first frame 4 can be derived. Similarly, when intending to enable the first frame 4 to move toward the negative direction of the X-axis, the third comb finger unit 503 and the fourth comb finger unit 504 simultaneously generate electrostatic forces to attract the first counter comb finger unit 5a'. At the same time, an inductive capacitance is generated between the negative X-axis direction sensing comb finger unit 5b-x and the first counter comb finger unit 5a' so that the moving distance of the first frame 4 can be derived. In addition, the embodiment of FIG. 8 also has the constraint anchor 2', the constraint hinge 31, the decoupling hinge 32, and the decoupling point 30. The related connecting relationships among the constraint anchor 2', the constraint hinge 31, the decoupling hinge 32, and the decoupling point 30 as well as the functions thereof have been described in FIG. 7, and will not be repeated here.

Please continue to refer to FIG. 8. For the Y-axis direction, a fifth comb finger unit 505, a sixth comb finger unit 506, a seventh comb finger unit 507, and an eighth comb finger unit 504 are connected to the anchor 2. A positive Y-axis direction sensing comb finger unit 5b+y is disposed between the seventh comb finger unit 507 and the eighth comb finger unit 508, and a negative Y-axis direction sensing comb finger unit 5b-y is disposed between the fifth comb finger unit 505 and the sixth comb finger unit 506. All comb finger units 505, 506, 507, 508, 5b+y, 5b-y are fixed to the substrate via the anchor 2 (please refer to FIG. 5). It can be seen in FIG. 8 that the electrostatic force directions of the fifth comb finger unit 505, the sixth comb finger unit 506, the seventh comb finger unit 507, and the eighth comb finger unit 508 all do not pass through the center point RA (rotating axis). However, because the fifth comb finger unit 505 and the sixth comb finger unit 506 are symmetrically disposed, the resultant force of the respective electrostatic forces of the fifth comb finger unit 505 and the sixth comb finger unit 506 passes through the center point RA. Similarly, because the seventh comb finger unit 507 and the eighth comb finger unit 508 are also symmetrically disposed, the resultant force of the respective electrostatic forces of the seventh comb finger unit 507 and the eighth comb finger unit 508 also passes through the center point RA. Therefore, when intending to enable the first frame 4 to move toward the positive direction of the Y-axis, the seventh comb finger unit 507 and the eighth comb finger unit 508 simultaneously generate electrostatic forces to attract the first counter comb finger unit 5a'. At the same time, an inductive capacitance is generated between the positive Y-axis direction sensing comb finger unit 5b+y and the first counter comb finger unit 5a' so that the moving distance of the first frame 4 can be derived. Similarly, when intending to enable the first frame 4 to move toward the negative direction of the Y-axis, the fifth comb finger unit 505 and the sixth comb finger unit 506 simultaneously generate electrostatic forces to attract the first counter comb finger unit 5a'. At the same time, an inductive capacitance is generated between the negative Y-axis direction sensing comb finger unit 5b-y and the first counter comb finger unit 5a' so that the moving distance of the first frame 4 can be derived. In addition, because the sensing comb finger and the actuating comb finger are both the application of the sensing capacitor, actually the functions of the sensing comb finger and the actuating comb finger can be replaced via software to increase the flexibility of use.

Please continue to refer to FIG. 8. Because the respective electrostatic forces of the first to the eighth comb finger units 501-508 all do not pass through the center point RA, if intending to make the first frame 4 rotate, in principle it is only necessary that one of the first to the eighth comb finger units 501-508 generates the electrostatic force, and the first frame 4 can rotate. For example, for the first, the third, the fifth, and the seventh comb finger units 501, 503, 505, 507, when one of them generates the electrostatic force, the first frame 4 can rotate clockwise. Certainly, in order to average forces, it is usually more appropriate to apply forces with the comb finger units in the diagonal direction; that is, the first comb finger unit 501 and the third comb finger unit 503 both generate electrostatic forces, or the fifth comb finger unit 505 and the seventh comb finger unit 507 both generate electrostatic forces. If in order to increase the driving force more quickly, the first comb finger unit 501, the third comb finger unit 503, the fifth comb finger unit 505, and the seventh comb finger unit 507 can all generate electrostatic forces to achieve the above effect. Similarly, for the second, the fourth, the sixth, and the eighth comb finger units 502, 504, 506, 508, when one of them generates the electrostatic force, the first frame 4 can rotate counterclockwise. Certainly, in order to average forces, it is usually more appropriate to apply forces with the comb finger units in the diagonal direction; that is, the second comb finger unit 502 and the fourth comb finger unit 504 both generate electrostatic forces, or the sixth comb finger unit 506 and the eighth comb finger unit 508 both generate electrostatic forces. If in order to increase the driving force more quickly, the second comb finger unit 502, the fourth comb finger unit 504, the sixth comb finger unit 506, and the eighth comb finger unit 508 can all generate electrostatic forces to achieve the above effect. Furthermore, the underside of each micro-electromechanical actuator unit 5 of the embodiment in FIG. 8 can have a cavity as shown in FIGS. 4 and 5 so that the waste materials and residues after etching can be discharged. The specific relationship between the cavity and the comb fingers or the flexible elements is as shown in FIG. 5 and its descriptions, and will not be repeated here.

Please continue to refer to FIG. 8. In this embodiment, the first frame 4 can also move obliquely on the XY plane. For example, for the movement toward the upper right direction, it can be achieved by the attractions generated by the pair of the first comb finger unit 501 and the eighth comb finger unit 508, or by the attractions generated by the pair of the second comb finger unit 502 and the seventh comb finger unit 507. Certainly, the movement toward the upper right direction can also be achieved by the attractions generated by the pair of the first comb finger unit 501 and the eighth comb finger unit 508, simultaneously with the attractions generated by the pair of the second comb finger unit 502 and the seventh comb finger unit 507; that is, the four comb finger units 501, 508, 502, 507 simultaneously generate electrostatic forces. Similarly, for the movement toward the lower left direction, the purpose of oblique movement is achieved by the third, the fourth, the fifth, and the sixth comb finger units 503, 504, 505, 506. As for the movement toward the upper left direction and the lower right direction, they are achieved in a similar fashion, and will not be repeated here.

In summary, through the embodiment as shown in FIG. 8, the present invention can achieve a micro-electromechanical actuating device providing a movement having multiple degrees of freedom on the plane, i.e. the horizontal movement on the XY plane (i.e. including the horizontal movement in the X-axis direction, the horizontal movement in the Y-axis direction, and the oblique and horizontal movement), and the rotation in the Z-axis direction. Through the comb finger units of the micro-electromechanical actuator anchored in the center, facing four sides, and disposed in pairs, although the directions of the electrostatic forces of the respective comb finger units of the micro-electromechanical actuator all do not pass through the center point, the supporting structure (the first frame, the inner frame, or the moving frame) can move horizontally as long as two comb finger units at the same side simultaneously operate with the same force. If only a single comb finger unit generates the electrostatic force, because the direction of the electrostatic force thereof does not pass through the center point, a force arm is formed between the electrostatic force and the center point, thereby generating a deflecting torque. In addition, by disposing a cavity on the substrate, the waste materials and residues generated during the manufacture of the actuator can be more easily discharged from the finger slits of the comb finger unit of the actuator, and from the place between the comb fingers and the substrate. Otherwise, the waste materials and residues are at least kept away from the comb fingers of the actuator so as not to affect the operation of the actuator so that the comb fingers of the actuator can be made smaller and denser, thereby enhancing the electro-mechanical converting efficiency, greatly increasing the driving force of the electrostatic force, and enhancing the yield rate. Moreover, a jig for the wire bonding is further used to support the movable part of the actuator of the present invention from below during the wire bonding so as to enhance the yield and the reliability of the wire bonding. It can be seen that the present invention has an outstanding contribution to this technical field.

Out-of-Plane Motion Motor

Figure 9A:
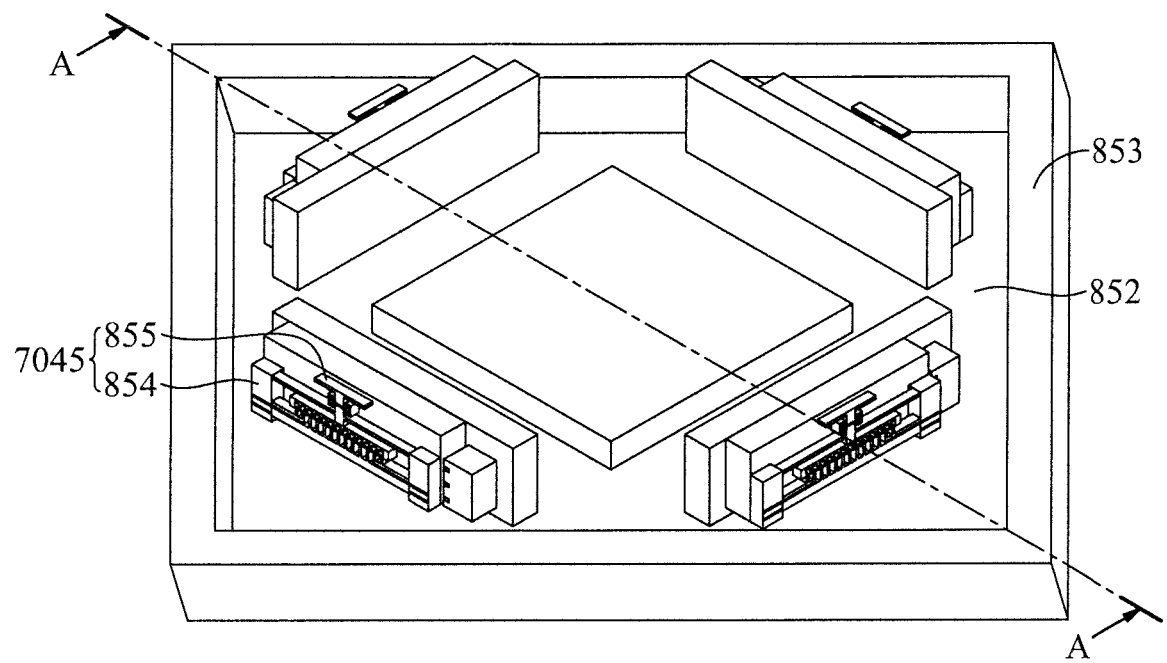
FIG. 9A is a schematic drawing showing an out-of-plane motion motor according to one embodiment of the present invention.
Figure 9B:
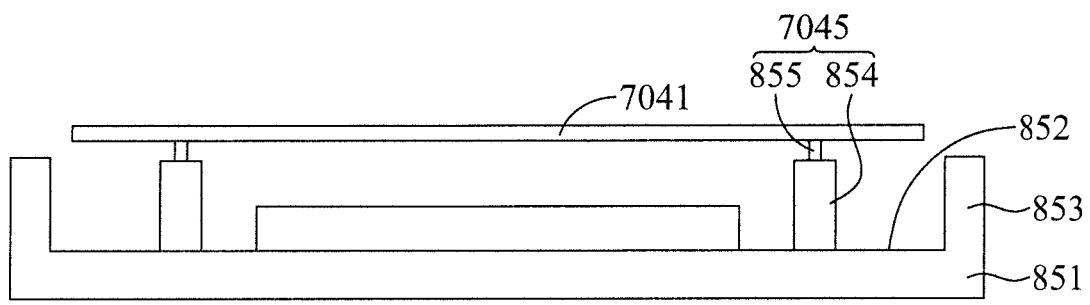
FIG. 9B is a schematic drawing showing a cross-section of an out-of-plane motion motor shown in FIG. 9A according to one embodiment of the present invention.
Figure 10:
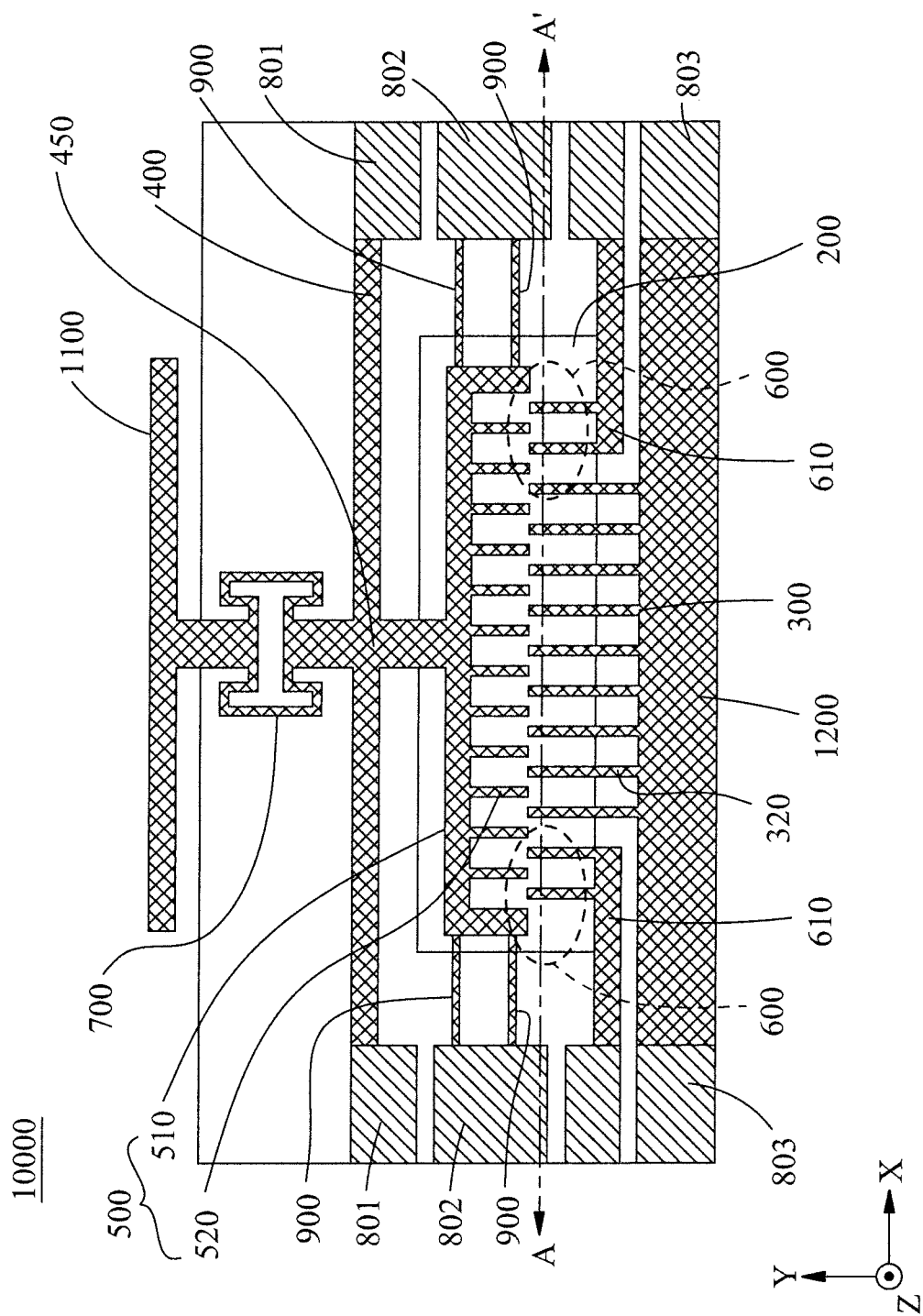
FIG. 10 shows the schematic top view of an embodiment of the single-axis actuator of the present invention.

FIG. 9A is a schematic drawing showing an out-of-plane motion motor according to one embodiment of the present invention, and FIG. 9B is a schematic drawing showing a cross-section A-A of an out-of-plane motion motor shown in FIG. 9A. As shown in FIG. 9A, the out-of-plane motion motor 7040 includes a base plate 851 having a base plate surface 852 and a base plate frame 853 disposed on a periphery of the base plate surface 852, and four single-axis motor 7045 disposed on the base plate surface 852. Each of the single-axis motor 7045 has an single-axis actuators 854 and an actuating end 855 moving along a direction parallel to a normal direction of the base plate surface 852. The actuating end can be a T-bar 1100 as shown in FIG. 10, depending on its shape. Accordingly, the actuating ends 855 can be moved in a direction parallel to each other, individually or cooperatively. Also referring to FIGS. 1, 2, 9A and 9B, the first bottom surface 1521 of the first circuit board 7033 is attached to the base plate frame 851 of the out-of-plane motion motor 7040, and the second bottom surface 1551 of the lead frame 7032 is directly or indirectly attached to and supported by the four actuating ends 855 of the four single-axis motors 7045. Each of the four single-axis motors 7045 can further include a fulcrum hinge 700 as shown in FIG. 10. The four single-axis motors 7045 can independently control the motion displacements of the actuating ends 855, and thus the second bottom surface 1551 of the lead frame 7032 is able to move along the direction vertical to the plane that the functional device 7020 lies in and/or rotate in the pitched or rolled direction. Alternatively, according to another embodiment of the present invention, an additional plate 7041 having a top surface 7042 is further disposed on the four actuating ends 855 as a platform to support the second bottom surface 1551 of the lead frame 7032. The second bottom surface 1551 of the lead frame 7032 can be adhered to the top surface 7042 of the additional plate 7041 by applying a glue layer or adhesive so that the second bottom surface 1551 of the lead frame 7032 is moved by the four actuating ends 855 through the additional plate 7041.

Figure 17A:
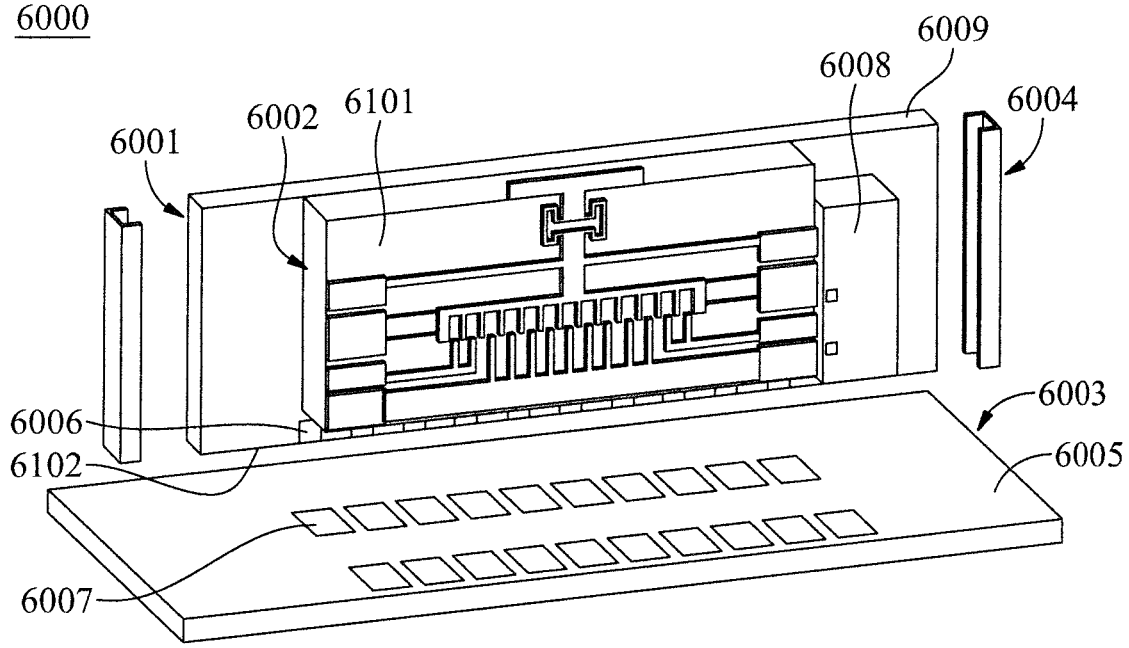
FIGS. 17A and 17B are schematic drawings each of which is showing the assembly of a single-axis motor module assembled with a base plate according to one embodiment of the present invention.
Figure 17B:
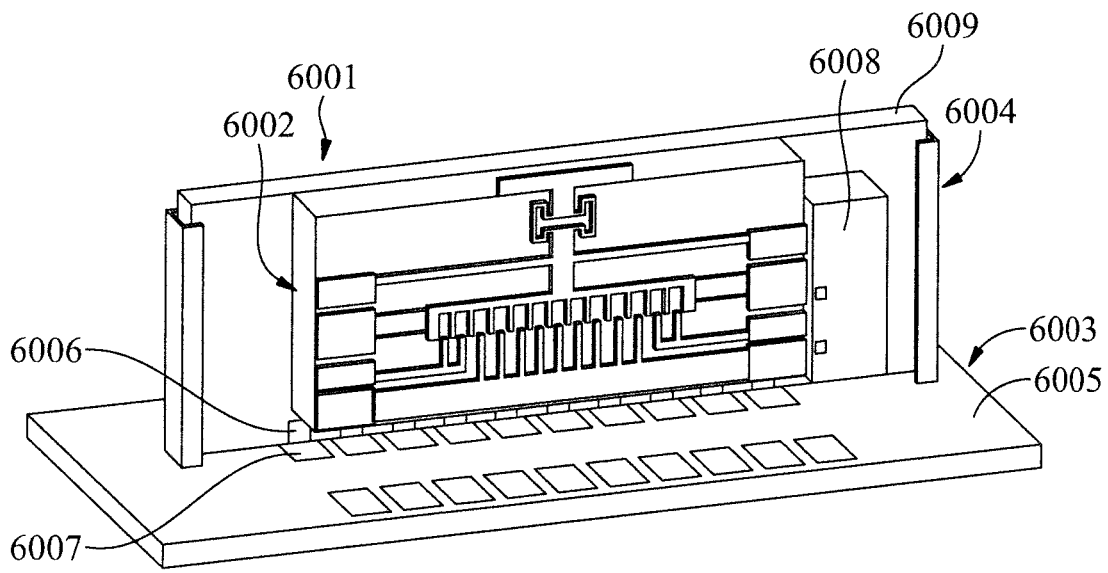

FIGS. 17A and 17B are schematic drawings each of which is showing a single-axis motor assembled with a base plate according to one embodiment of the present invention. As shown in FIGS. 17A and 17B, the four single-axis actuators 6002 are cut from a substrate produced by a semiconductor process. Each of the four single-axis actuator 6002 is assembled to form a single-axis motor 6001 as shown in FIGS. 17A and 17B, and then the single-axis motor 6001 is flipped 90 degrees up and is fixed on the base plate surface 6005 of the base plate 6003 by welding the contact pads 6006 on the four single-axis motor 6001 to the metal pads (not shown) on the base plate surface 6003 or the metal pads 6007 on the base plate surface 6005 of the base plate 6003. Each of the four single-axis motors 6001 is held through two clamps 6004 fixed on the base plate surface 6003 to enhance the fixing strength of each of the four single-axis motors 7045. The metal pads (not shown) on the base plate surface 852 as shown in FIG. 9A, which metal pads are similar to the metal pads 6007 shown in FIGS. 17A and 17B, and the contact pads (not shown) on the four single-axis motors 7045 as shown in FIG. 9A, which contact pads are similar to the contact pads 6006 shown in FIGS. 17A and 17B, are designed as required. The connections between the metal pads 6007 on the base plate surface 852 or the metal pads 6007 on the base plate surface 6005 of the base plate 6003 and the contact pads 6006 on the four single-axis motors 6001 are also for providing signals and biases for control needs.

Single-Axis Actuator (Linear Actuator)

Figure 11:
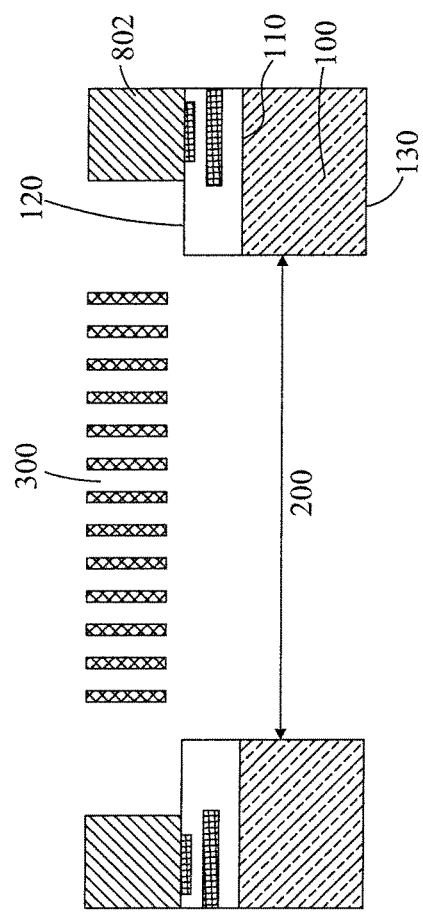
FIG. 11 is a schematic sectional view of the single-axis actuator along the section line A-A' in FIG. 10.
Figure 12A:
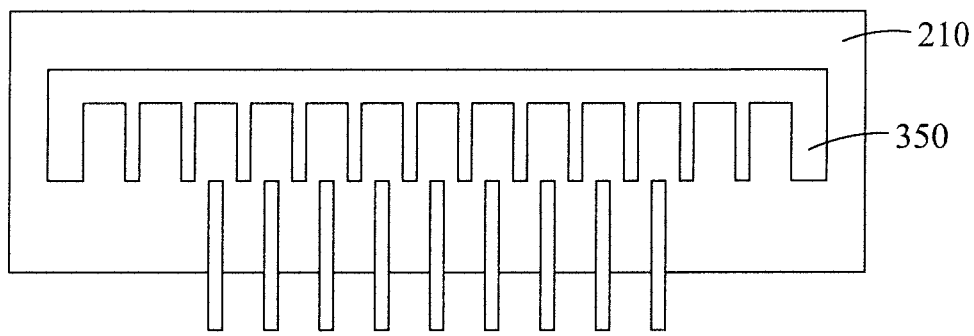
FIG. 12A shows an example of the relationship of the second projection area and the first area.
Figure 12B:
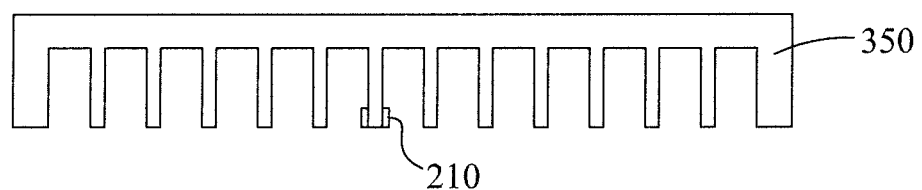
FIG. 12B shows another example of the relationship of the second projection area and the first area.

Please refer to FIGS. 10-11. FIG. 10 shows the schematic top view of an embodiment of the actuator of the present invention, namely the single-axis actuator 10000. The single-axis actuator 10000 is a linear motion actuator. FIG. 11 is a schematic sectional view of the single-axis actuator along the section line A-A' in FIG. 10. The single-axis actuator 10000 includes a substrate 100, which has a cavity 200 and an electronic element 110. The substrate 100 has a front surface 120 and a rear surface 130, and the cavity 200 extends through the front surface 120 and the rear surface 130 in the z-direction as defined in FIG. 10. The single-axis actuator 10000 also includes a first fixed electrode structure 300 formed on the substrate 100 so that the first fixed electrode structure 300 is fixed on the substrate 100. The single-axis actuator 10000 further includes a movable electrode structure 500 connected to the substrate 100 through an elastic element 400, which may be an elastic linkage. The first fixed electrode structure 300 and the movable electrode structure 500 form a capacitor. In the embodiment shown in FIG. 10, both the first fixed electrode structure 300 and the movable electrode structure 500 are comb structures. Therefore, the first fixed electrode structure 300 has a first plurality of comb fingers 320 and the movable electrode structure 500 has a second plurality of comb fingers 520. Each of the first plurality and the second plurality of the comb fingers 320, 520 are parallel to one another. When there is no voltage applied between the first fixed electrode structure 300 and the movable electrode structure 500, the comb fingers 320 of the first fixed electrode structure 300 and the comb fingers 520 of the movable electrode structure 500 do not interdigitate. The capacitor is formed through the first plurality and the second plurality of comb fingers 320, 520. The first plurality and the second plurality of comb fingers 320, 520 are disposed above the cavity 200 to ensure the residual materials from processing can be completely removed through the cavity 200. Therefore, the size of the cavity 200 has to be sufficiently large to completely remove the residual materials; a square with side length slightly more than 10 microns would be sufficiently large. To put it another way, if one looks upward from the cavity 200 on the rear surface 130 and sees any comb finger, then the cavity 200 is sufficiently large. In the present invention, the horizontal projection area of the cavity 200 is defined as a first area 210, and the horizontal projection area of at least one of the first fixed electrode structure 300 and the movable electrode structure 500 is defined as a second projection area 350 on the substrate. FIG. 12A shows an example of the second projection area 350 on the substrate, wherein the second projection area 350 is the projection area of both the first fixed electrode structure 300 and the movable electrode structure 500. The second projection area can be the projection area of only one of the first fixed electrode structure 300 and the movable electrode structure 500. The first area 210 and the second projection area 350 overlap. By "overlap" we mean that the first area 210 and the second projection area 350 overlap a certain percentage, say at least 1% of the second projection area 350, for the size of the cavity 200 to be sufficiently large to completely remove the residual materials, as shown in FIG. 12B, wherein the second projection area 350 is the projection area of the movable electrode structure 500. Without the cavity 200, the comb fingers 320, 520 have to be sparsely arranged to remove the residual materials. But when the comb fingers 320, 520 are sparsely arranged, the efficiency of electrical-to-mechanical energy conversion is low. In other words, the voltage applied between the first fixed electrode structure 300 and the movable electrode structure 500 has to be high. Hence, the cavity 200 allows the removal of residual process contaminants and the improvement of the efficiency of electrical-to-mechanical energy conversion.

Figure 12C:
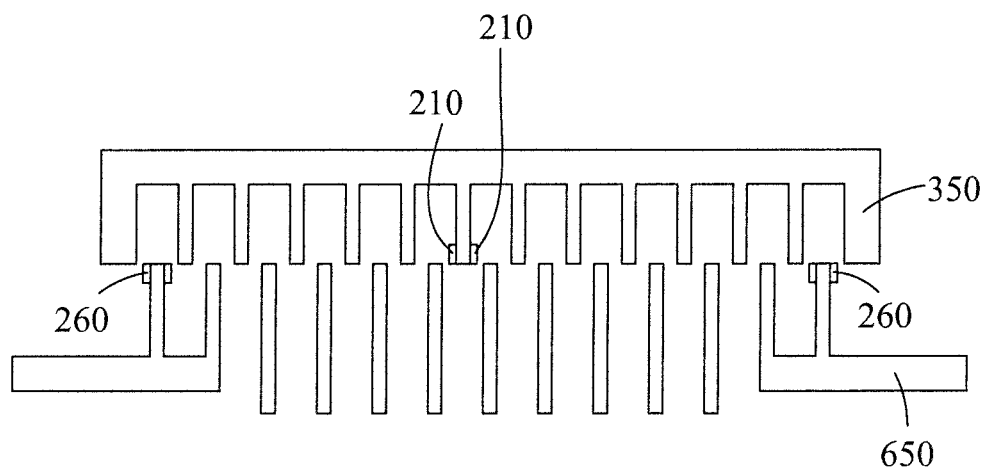
FIG. 12C shows an example of the position of the second cavity.

The electronic element 110 disposed on the substrate 100 represents the integration of all the motion control electronic components and circuits on the substrate 100. The single-axis actuator 10000 further includes at least one position sensing capacitor 600 formed by the movable electrode structure 500 and a second fixed electrode structure 610 formed on the substrate 100. The at least one position sensing capacitor 600 is disposed above either the cavity 200 or a second cavity of the substrate 100. If the cavity 200 also allows the removal of residual process contaminants for the at least one position sensing capacitor 600, then there is no need for the second cavity. For example, in the embodiment shown in FIG. 10, the cavity 200 is large enough to remove residual process contaminants for two position sensing capacitors 600, and there is no second cavity. When there is need, a second cavity or cavities can be disposed in the substrate 100 to remove residual process contaminants specifically for the at least one position sensing capacitor 600. For example, in the embodiment shown in FIG. 12C, the second fixed electrode structure 610 of the position sensing capacitor 600 has a horizontal projection area 650, the second cavity has a horizontal projection area 260, and the position sensing capacitor 600 is disposed above the second cavity of the substrate. The at least one position sensing capacitor 600 is used for detecting the displacement of the movable electrode structure 500.

Figure 13A:
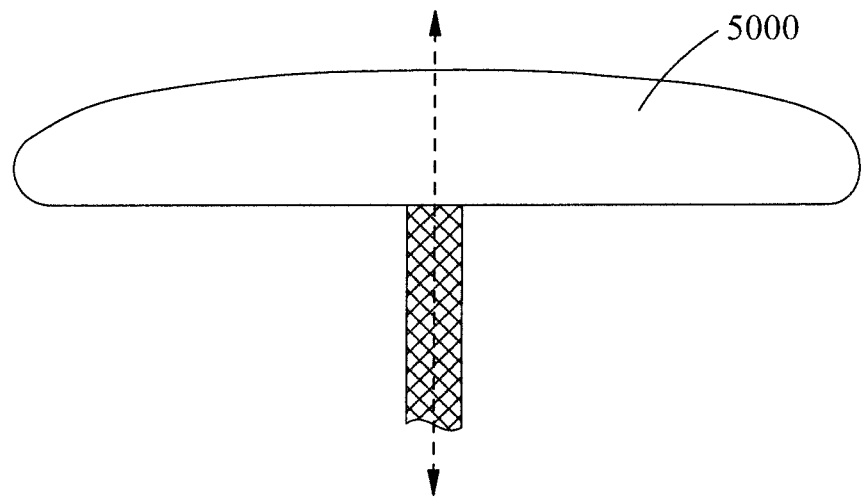
FIG. 13A shows an example in which the center of gravity of the carried object aligns the center of gravity of the single-axis actuator without the T-bar and the fulcrum hinge.
Figure 13B:
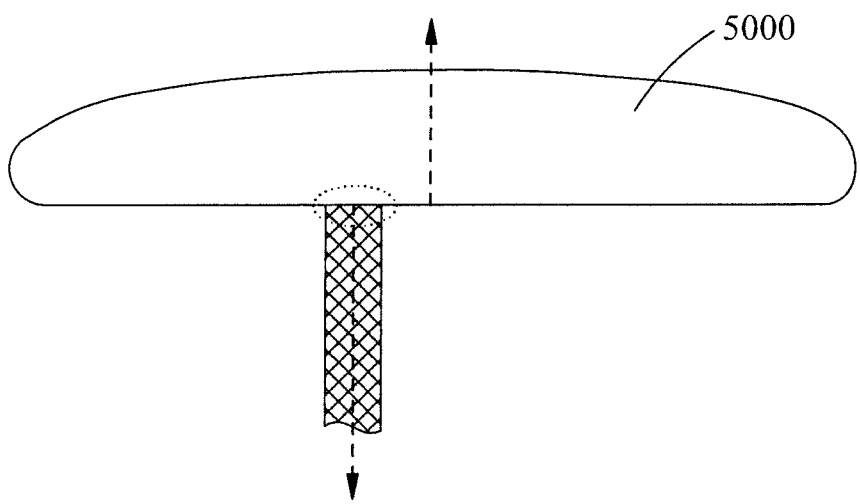
FIG. 13B shows an example in which the center of gravity of the carried object does not align the center of gravity of the single-axis actuator without the T-bar and the fulcrum hinge.
Figure 13C:
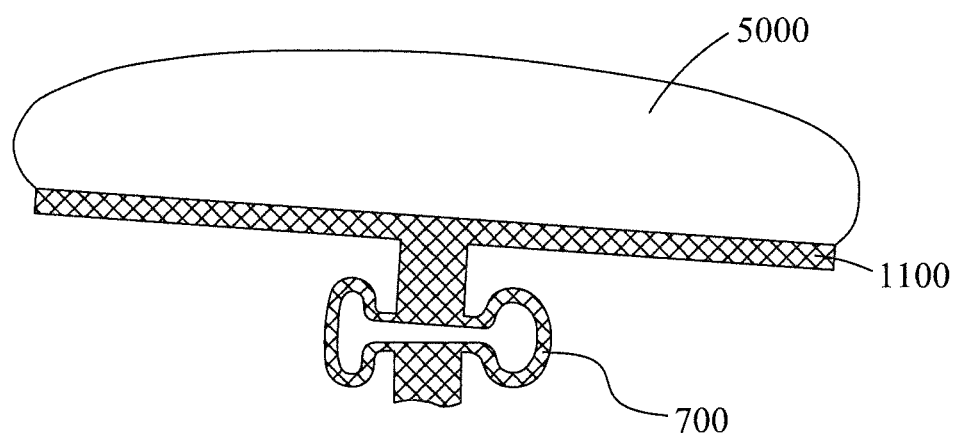
FIG. 13C shows an embodiment of the present invention with both the fulcrum hinge and the T-bar.
Figure 14A:
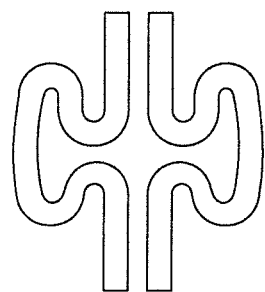
FIGS. 14A and 14B show the schematic top views of two additional embodiments of the fulcrum hinge.
Figure 14B:
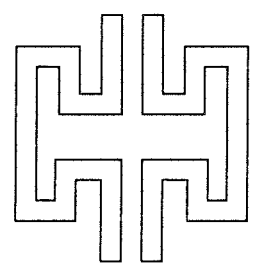

In the embodiment shown in FIG. 10, the elastic element 400, or the elastic linkage, is called a main hinge. The main hinge has a first end, a first center point 450 and a second end, and the first and the second ends are fixed on the substrate 100. Each of the first and the second ends is fixed on the substrate 100 by a first anchor 801. The movable electrode structure 500 has a keel 510 connected with the first center point 450. The single-axis actuator 10000 further includes a fulcrum hinge 700 connected with the first center point 450 and a T-bar 1100 connected with the fulcrum hinge 700. The T-bar 1100 is adopted for easily holding the carried object attached thereon. In further applications, this single-axis actuator 10000 is designed to be flipped 90 degrees for driving a carried object to move along the out-of-plane direction. The purpose of the fulcrum hinge 700 is to resolve the issue of the carried object peeling from the T-bar 1100 when there is a shear force applied to the connecting point between the fulcrum hinge 700 and the T-bar 1100. Please see FIGS. 13A-13C. FIG. 13A shows an example in which the center of gravity of the carried object 5000 aligns the center of gravity of the single-axis actuator without the T-bar and the fulcrum hinge. In comparison, FIG. 13B shows an example in which the center of gravity of the carried object 5000 does not align the center of gravity of the single-axis actuator without the T-bar and the fulcrum hinge. In FIG. 13B, the stress concentrates on the circled area, and thus, a torque is produced. FIG. 13C shows an embodiment of the present invention with both the fulcrum hinge 700 and the T-bar 1100 to avoid the problem arising from FIG. 13B. The fulcrum hinge 700 has low stiffness in the x-direction but high stiffness in the y-direction and z-direction. In other words, the stiffness in the y-direction $k_y$ is much greater than the stiffness in the x-direction $k_x$, i.e. $k_y \gg k_x$, and the stiffness in the z-direction $k_z$ is also much greater than the stiffness in the x-direction $k_x$, i.e. $k_z \gg k_x$. High stiffness in the y-direction is necessary to avoid the decrease of displacement in the y-direction. One skilled in the art can design a variety of fulcrum hinges to meet the requirements. FIGS. 14A and 14B show the schematic top view of two embodiments of the fulcrum hinge in addition to the fulcrum hinge 700 shown in FIG. 10 or 13C. For the case without the fulcrum hinge 700, an external x-directional force applied to the carried object may generate a shear force and a moment at the boundary surface between the carried object and the T-bar 1100. The large shear force and/or the moment may cause the carried object to peel from the surface of T-bar 1100. For the case with the fulcrum hinge 700, the external x-directional force applied to the object may lead to a deformation of the fulcrum hinge 700 to reduce the shear force and the moment at the boundary surface between the carried object and the T-bar 1100. In some circumstances, the fulcrum hinge 700 can be omitted if the shear force is negligible.

The single-axis actuator 10000 further includes at least one pair of constraining hinges 900, wherein each constraining hinge of the at least one pair of constraining hinges 900 has a third end and a fourth end, the third end is connected to either the keel 510 or an outermost comb finger of the second plurality of comb fingers, and the fourth end is fixed on the substrate 100 by a second anchor 802. In the embodiment shown in FIG. 10, there are two pairs of constraining hinges 900. Through a simulation, it is seen that when the y-directional force of 0.05N is applied to the T-bar 1100, the y-directional motion travels up to 500 microns and the deformation of the main hinge still does not reach the fracture strength. In other words, the present invention can be utilized to provide large motion strokes above 500 microns in the out-of-plane direction. When the y-directional and x-directional forces are both 0.05N, the constraining hinges 900 effectively limit the off-axis motion of the movable electrode structure 500. In the Meantime, the fulcrum hinge 700 is also effectively deformed to prevent the carried object from peeling off from the surface of T-bar 1100. The force of 0.05N is equivalent to 1,020 g (g denotes one gravity) when the mass of the carried object is 5 milligrams. Thus, the single-axis actuator of the present invention can overcome the problem of the robustness of impact The single-axis actuator 10000 further includes a support arm 1200 where the first fixed electrode structure 300 extends therefrom, wherein the support arm 1200 has a fifth end and a sixth end, and each of the fifth and the sixth ends is fixed on the substrate 100 by a third anchor 803.

Figure 15A:
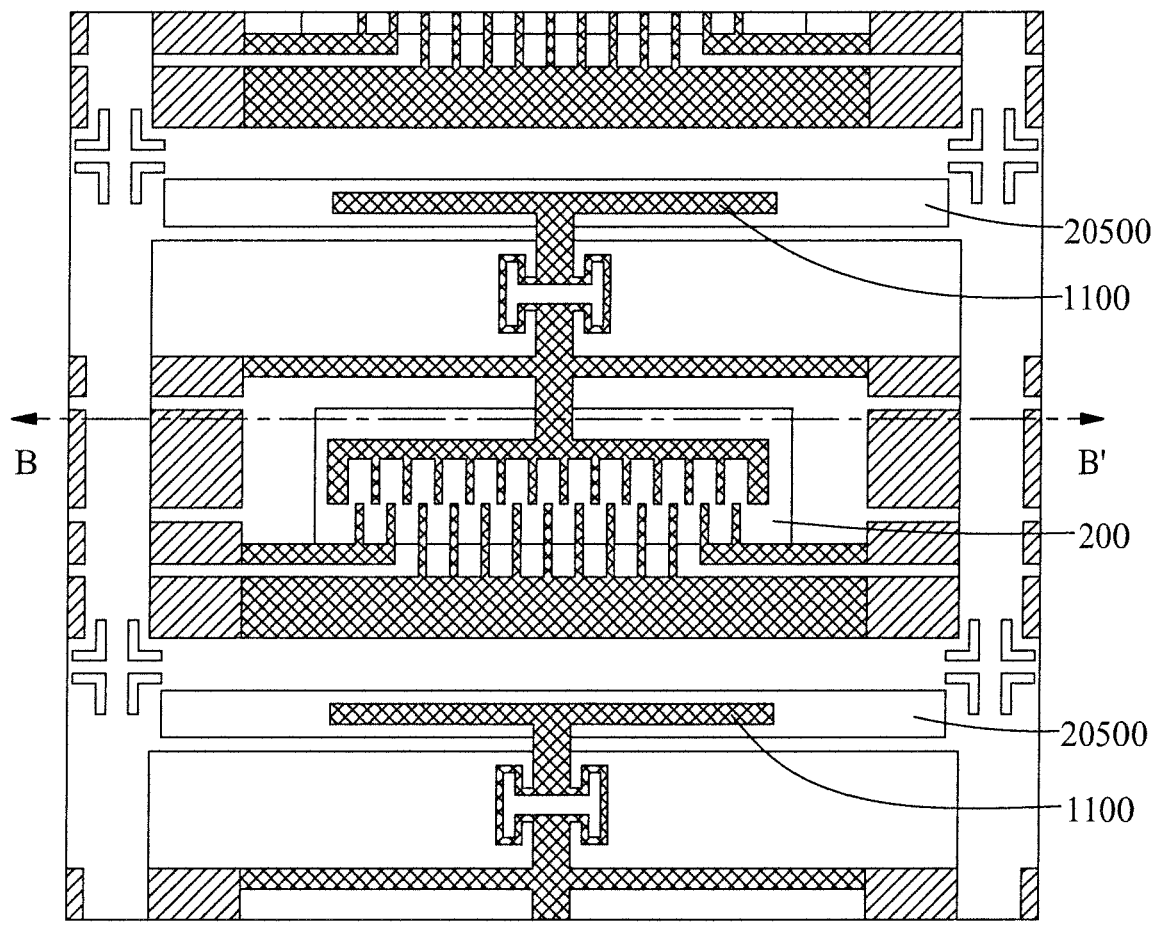
FIG. 15A shows schematically the chip arrangement on the actuator wafer.
Figure 15B:
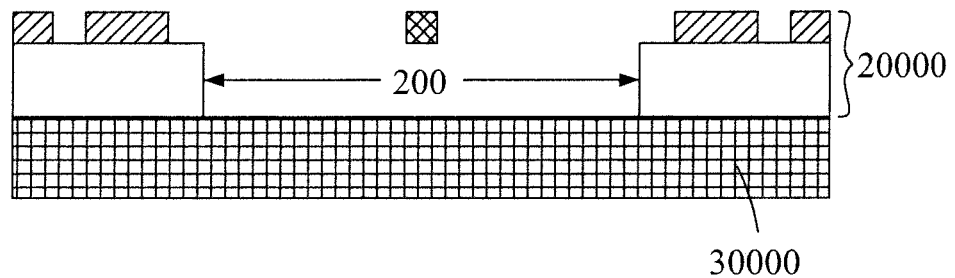
FIG. 15B is a schematic sectional view along the section line B-B' in FIG. 14A.
Figure 15C:
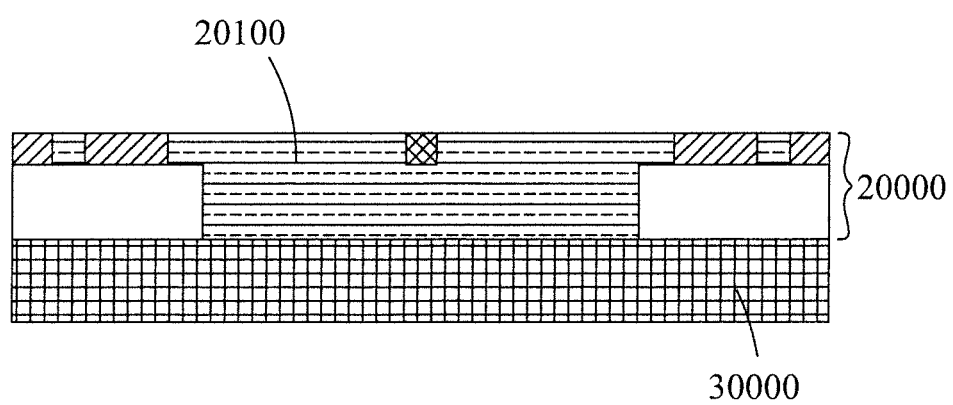
FIG. 15C illustrates a protective material coated on the actuator wafer for fixing the movable structures for wafer cutting.

The actuator wafer at this stage has a lot of chips with the movable structures. How to protect these movable structures in the chips until the actuator wafer being cut to separate the chips is a very important issue. FIGS. 15A-15C illustrate how to protect the movable structures of the single-axis actuator 10000 for wafer cutting. As shown in FIG. 15A, there is a third cavity 20500 in the substrate at the position of T-bar 1100 before the wafer cutting process. The third cavity 20500 is reserved for the motion strokes of the T-bar 1100. As shown in FIG. 15B, the actuator wafer 20000 is attached to a carrier wafer 30000. As shown in FIG. 15C, a protective material 20100 such as a photoresist or wax is coated on the actuator wafer 20000 for fixing the movable structures for wafer cutting. After the wafer cutting, the carrier wafer 30000 is separated from the actuator wafer 20000, and the protective material 20100 is removed to obtain the chips, each of which includes a single-axis actuator 10000. Both the separation of wafers and the removal of the protective material 20100 can be easily achieved by applying chemicals.

The single-axis actuator provided by the present invention allows the making of an out-of-plane motion motor with a large motion stroke, the robustness of impact, the easy removal of residual process contaminants, an improvement of the efficiency of electrical-to-mechanical energy conversion and the off-axis motion decoupling of movable comb structure.

Single-Axis Motor Module

Figure 16:
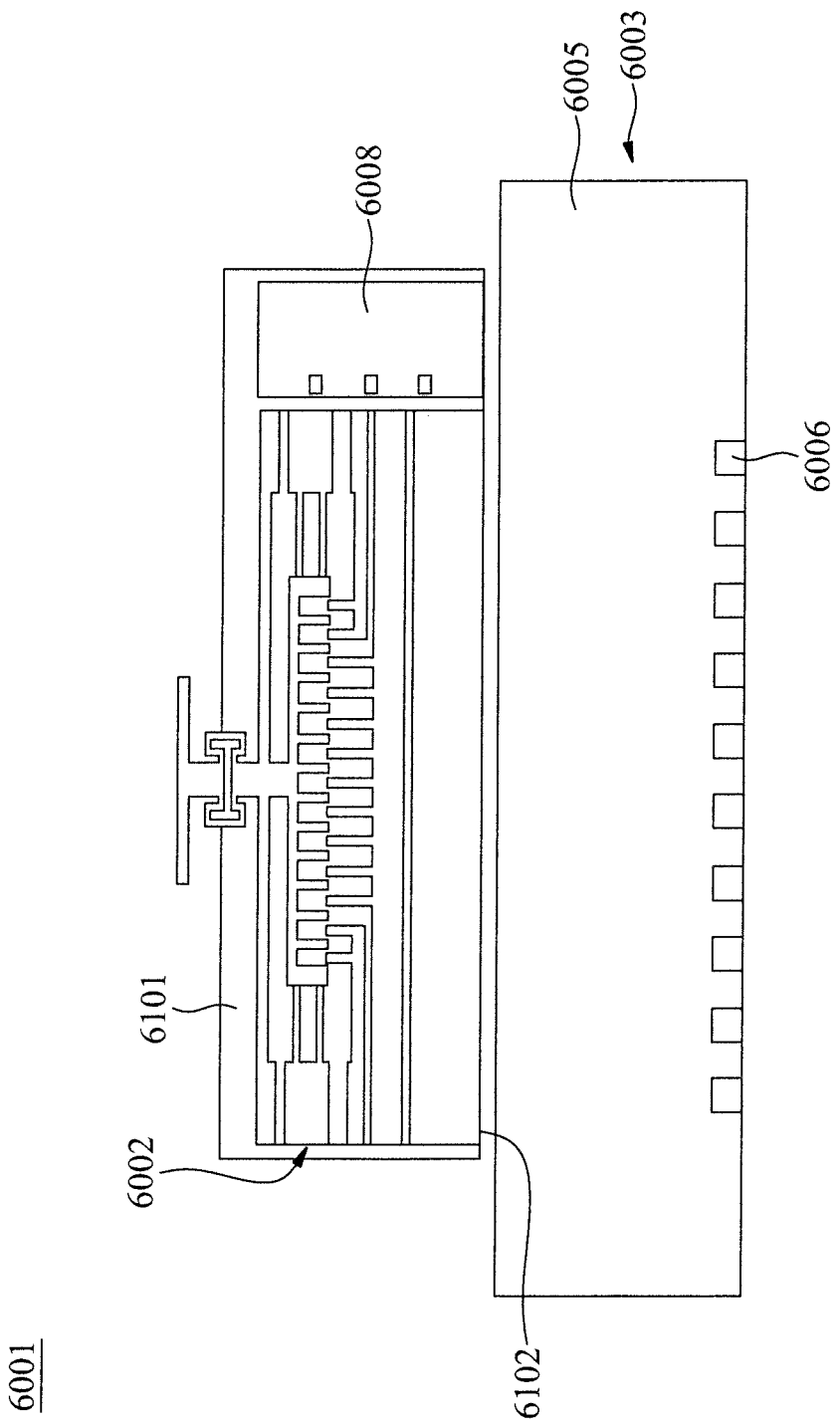
FIG. 16 is a schematic exploded view drawing showing a single-axis motor module assembled with a PCB according to one embodiment of the present invention.

FIG. 16 is a schematic exploded view drawing showing a single-axis motor assembled with a PCB according to one embodiment of the present invention. As shown in FIG. 16, a single-axis motor 6001 includes a single-axis actuator 6002, a rigid printing circuit board (PCB) 6003 having a metal circuitry routing (not shown) thereon and at least an amount of the metal pads 6006 and a control chip 6008 adjacent to the single-axis actuator 6002. The control chip 6008, can be an Application specific Integrated Circuits (ASIC) chip, and can be formed together with the single-axis actuator 6002 on the substrate 6009 when the single-axis actuator 6002 is produced by a photolithographic process in a semiconductor manufacturing process. The control chip 6008 electrically connects the single-axis actuator 6002 to control the actuation of the actuating end of the single-axis actuator 6002. The single-axis actuator 6002 is well aligned with and mounted on the rigid PCB 6003. In case the control chip 6008 is separately produced from the manufacturing of the single-axis actuator 6002, the control chip 6008 is placed nearby the single-axis actuator 6002 and is mounted on the PCB 6003. A wire bonding process is applied to electrically connect the single-axis actuator 6002, control chip 6008 and PCB 6009. The wire bonding process can be a welding process and is a solder paste process, for example. Two clamps (not shown) similar to those clamps 6004 as shown in FIGS. 17A and 17B can be optionally fixed on the base plate surface 6005 to hold the single-axis actuator 6002 at both ends, and to enhance the fixing strength of the single-axis actuator 6002.

FIGS. 17A and 17B are schematic drawings each of which is showing the assembly of a single-axis motor module 6000. The single-axis motor module 6000 includes one single-axis motor actuator 6002 and a base plate 6003. The single-axis actuator 6002 has a planar surface 6101 and a side surface 6102. If the single-axis motor module 6000 is used for an apparatus having one out-of-plane motion according to one embodiment of the present application, as shown in FIGS. 17A and 17B, the single-axis motor 6001 is welded to the base plate surface 6005 of the base plate 6003 of the single-axis motor module 6000, and the single-axis motor module 6000 is a unit apparatus for sale. If the single-axis motor module 6000 or the single-axis motor 6001 is used for an apparatus having multiple out-of-plane motions with or without the in-plane motions according to one embodiment of the present application, the single-axis motor module 6000 or the single-axis motor 6001 shown in FIGS. 16, 17A and 17B is welded to the base plate surface 852 of the base plate 851 of the out-of-plane motion motor 7040 shown in FIG. 1. In the case that the single-axis motor module 6000 is a single apparatus for sale, the contact pads 6006 on the PCB 6009 of the single-axis motor module 6000 is welded to the metal pads 6007 on the base plate 6003. A wire bonding process is applied to electrically connect the single-axis actuator 6002, control chip 6008 and the base plate 6003. The wire bonding process can be a welding process, a solder paste process, or a combination thereof, for example. Two clamps 6004 fixed on the base plate surface 6005 are used to hold the single-axis motor 6001 and to enhance the fixing strength of the single-axis motor 6001.

Assembly of an Apparatus Having in-Plane and Out-of-Plane Motions

An assembly of the light sensing apparatus according to one embodiment of the present application is described as follows. Referring to FIGS. 1 and 2 again, a thin glue layer (not shown) is applied or coated on the top surface 7042 of the additional plate 7041 and on the base plate frame 853 of the base plate 851 of the out-of-plane motion motor 7040. Attach the in-plane motion motor 7030 to the out-of-plane motion motor 7040 by attaching the circuit board 7033 to the base plate frame 853 and at the same time making the second bottom surface 1551 of the lead frame 7032 to be forced to contact the top surface 7042 of the additional plate 7041 with an assistance of a jig or tooling. The sequences of the assembly may vary depending on the optimization of the assembly process. After that, a high temperature curing process is required for fixing the in-plane motion motor 7030 and the out-of-plane motion motor 7040 permanently. Then the application device 7010, such as a filter allowing lights having wavelengths within a predetermined range to pass therethrough, is placed on the first circuit board 7033. If the application device 7010 is a visible light filter, the incoming lights having wavelength within the range of the visible light are transmitted through the application device 7010. For the camera application, the visible light filter is chosen. For different application, if the application device 7010 is an infrared radiation filter, incoming lights having wavelengths within the range of IR are transmitted through the infrared radiation filter.

A controller, which is not shown in the FIG. 1, is provided to electrically connect to the out-of-plane motion motor and the in-plane motion motor and control the movement of each of the single-axis motors 6002 and the in-plane motion actuator 7031.

After assembly, a light sensing apparatus 7000 having functions of optical image stabilization, auto focus and super resolution with 6 degree-of-freedom (DOF) movement ability according to one embodiment of the present application is constructed. The optical image stabilization is implemented by the compensation provided by the in-plane motion motor 7030 in the plane that the functional device 7020 lies in and by the four single-axis motors 7045 in the out-of-plane motion motor 7040 in the direction vertical to the plane that the functional device 7020, such as a CMOS image sensor, lies in and/or rotate in the pitched or rolled direction. The auto-focus function is implemented by the displacement of the four single-axis actuators 7045 in the out-of-plane motion motor 7040 in the direction vertical to the plane that the functional device 7020 lies in. The super resolution function is implemented by the movement incrementally moved by the in-plane motion motor 7030 in a plane that the image sensing apparatus lies in. When the light sensing apparatus 7000 is used for the camera application, the superposition and synthesis of images taken with the incremental movement in a scale of being from sub-micrometers to micrometers can form the image with super resolution. If the optical image stabilization and auto focus functions are also included, a camera with multi-functions including optical image stabilization, auto focus and super resolution are fulfilled. This kind of camera using MEMS actuators with 6 DOF motions having the advantages of impact size, low cost, precise motion control, and low power consumption is provided by the present invention, and is impossible to achieve by the prior art.

In addition to the utilization of four single-axis motors 7045, one, two three or more single-axis motors 7045 can be used in the out-of plane motion motor 7040 according to another embodiment of the present invention. For example, when only one single-axis motor 7045 are used in the out-of-plane motion motor 7040, only the movement in one direction vertical to the plane that the functional device 7020 lies in can be implemented. When two or three single-axis motors 7045 are used, both of the vertical movement and a tilt movement can be implemented.

Accordingly, according to another embodiment of the present invention, when three single-axis motors 7045 are used, an apparatus 7000 having in-plane and out-of-plane motions can also be provided. FIGS. 1-3 and 10A-10B can still be referred with a difference that three single-axis motors 7045 rather than four of them are used. The apparatus 7000 includes an in-plane motion motor capable of moving an object in a first set of three degrees of freedom, i.e. moving in two transversal directions and one yawed rotational direction, with respect to a reference plane 160; and an out-of-plane motion motor 7040 supporting thereon the in-plane motion motor 7030, and including three single-axis motors 7045. Each of the three single-axis motors 7045 has an actuating end 855; and the three actuating ends cooperatively enable the reference plane to move in a second set of three degrees of freedom, i.e. moving in a vertical direction and two tilt directions. The object that can be further included in the apparatus 7000 can be an application device 7010 configured for an application function. The application device 7010 is mounted on the in-plane motion motor. The application device 7010 configured for an application function can be a filter or a lens, and the application function is to allow lights having wavelengths within a predetermined range to pass therethrough.

The in-plane motion motor 7030 includes a functional device 7020 such as a sensor configured for sensing a light; a first circuit board 7033 having a first bottom base 7034 with a central cavity 7035 and a first circuit board frame 7037 disposed thereon, where the first bottom base 7034 has a first bottom surface 1521; a lead frame 7032 is disposed inside the central cavity 7035, and has a second bottom surface 1551 and four hinges 1552; and an in-plane motion motor 7031 having a movable inner frame 1571 and a fixed outer frame 1572. The movable inner frame 1571 moves along at least one of two directions perpendicular to each other and parallel to the first bottom surface 1521. The application device 7010 is disposed on the first circuit board frame 7033.

The out-of-plane motion motor 7040 includes a base plate 851 having a base plate surface 852 and a base plate frame 853 disposed on a periphery of the base plate surface 852. Three single-axis motors 7045 are disposed on the base plate surface 852, each of which moves along a specific direction parallel to each other and parallel to a normal direction of the base plate surface 852. The first bottom surface 1521 is attached to the base plate frame 853. The second bottom surface 1551 is attached to the three actuating ends 855. An additional plate 7041 can also be introduced between the second bottom surface 1551 and the three actuating ends 855. Accordingly, the three actuating ends on three single-axis motors 7045 of the apparatus 7000 cooperatively enable the reference plane 160 to be capable of moving in another three degrees of freedom.

The Image Capturing Device for Obtaining a Target Image with a Higher Resolution As shown in FIGS. 2 and 3, when a functional device 7020 such as an image sensor configured for sensing a raw image is disposed on the in-plane motion motor 7030, the image capturing device for obtaining a target image with a higher resolution is formed. The image sensor has a plurality of sensing pixels correspond to the plurality of pixel areas of an image target respectively. For easy understanding to the descriptions below, the pixel pitch of the sensing pixels is assumed to be 12 micrometers and the resolution of the image sensor in the camera is assumed to be 640×480. Without using the image capturing device according to the present invention, the target image taken in each shot using the camera in the prior art has only the resolution of 640×480, which is equal to that of the image sensor in the camera. However, using the image capturing device according to the present invention, the target taken can have the resolution larger than, or have the multiple of the resolution of, 640×480 of the image sensor. The details will be described below.

In addition, if an application device 7010, such as a filter, is applied in front of the functional device 7020 (i.e. the image sensor), the filter 7010 allows a light having wavelengths within a predetermined range to pass therethrough, and the image sensor 7020 can capture the raw image having the same range of the wavelengths. The wavelengths can be within a visible light and an infrared light range, depending on the wavelengths that the filter 7010 allows to pass through. Accordingly, a visible light image or a thermal image can be captured by the image sensor 7020.

The image capturing device can further include an out-of-plane motion motor 7040 disposed below the in-plane motion motor 7030 for auto-focus application if necessary. For example, when the filter 7010 allows only the visible light to pass through, the auto-focus function may be necessary. In addition, the out-of-plane motion motor 7040 can also apply to the anti-vibration function. Furthermore, as shown in FIGS. 1 and 2, in case that an out-of-plane motion motor is disposed below the in-plane motion motor 7030, the four hinges (or called four linkages) 1552 of the lead frame 7032 are all flexible so that the out-of-plane motion motor 7045 can move the image sensor 7020 in a direction vertical to the base plate surface 852. However, in case that no out-of-plane motion motor is disposed below the in-plane motion motor 7030, the four linkages can be rigid.

The in-plane motion motor can have at least two different designs. Type 1 of the in-plane motion motor has a built-in single-axis actuator, which applies for a product of a customer-oriented design, while Type 2 has a unified single-axis actuator, which is modularized and suitable for functional devices having a variety of dimensions in different image capturing devices.

Type 1: The Image Capturing Device Using an in-Plane Motion Motor Including an in-Plane Motion Actuator Having at Least One Built-in Single-Axis Actuator for a Customer-Oriented Design The image capturing device for obtaining an image with a higher resolution according to the present invention utilizes the in-plane motion motor 7031 having at least one single-axis actuator 5 (or called a micro-electromechanical actuator unit 5) as shown in FIGS. 4 and 7-8. The at least one single-axis actuator 5 is built in the in-plane motion motor 7031.

Again, please refer to FIGS. 3 and 4, the in-plane motion motor 7031 or called micro-electromechanical actuator includes a substrate 1, a first frame 4, and a second frame 6. The descriptions below are based on the case that the first frame 4 is a movable inner frame, and the second frame 6 is a fixed outer frame. Accordingly, the first comb fingers 5a, which is fixed, are called the first set of fixed comb fingers 5a, and the first counter comb fingers 5a', which is movable, are called the first set of movable comb fingers 5a' hereinafter. The movable inner frame 4 and the fixed outer frame 6 are formed on the substrate 1, and the fixed outer frame 6 surrounds the movable inner frame 4. As shown in FIGS. 3-4 and 7-8, the in-plane motion motor 7031 further includes a first actuator 5 (totally four actuators 5 are present in FIGS. 4 and 7-8). The first actuator 5 includes a first set of movable comb fingers 5a' connected to the movable inner frame 4, and a first set of fixed comb fingers 5 connected to the fixing portion 2 of the substrate 1. The actuation of the in-plane motion motor 7031 are the same as those described previously.

In case that there is only one single-axis actuator 5 (i.e. the first single-axis actuator 5) as shown in FIGS. 4 and 7-8 which includes a first comb finger unit 5a and a first counter comb finger unit 5a', is disposed in the in-plane motion motor 7031, the first single-axis actuator 5 can cause the image sensor 7020 to be disposed on the movable inner frame 4 to move with a distance in a first direction (say, in the X-direction) parallel to the surface of the image sensor 7020. For taking the image having a resolution higher than 640×480, the image sensor 7020 is positioned at its original position (i.e. at a coordinate of (0,0) in a Cartesian coordinate system) without being actuated by the single-axis actuator 5 in the in-plane motion motor 7031, and a first raw image is sensed and taken by the image sensor 7020. After that, the image sensor 7020 is moved by the single-axis actuator 5 in the first direction (say, in the X-direction) with a distance being 1/N (wherein N=2) of the pixel pitch, in this case, the distance being 6 micrometers, and a second raw image is sensed and taken by the image sensor 7020. The first and the second raw images, both having a 6 micrometers shift therebetween accordingly, can be synthesized into a higher resolution image having a resolution of 1280×480, which resolution is two times that of 640×480. If N is 3, 3 raw images in total are taken and can be synthesized into a higher resolution image having a resolution of 1920×480, which is three times that of 640×480. A controller configured to synthesize the plurality of the taken raw images into the higher resolution image is required in the present invention.

In case that two single-axis actuators 5 (i.e. the first single-axis actuator and a second single-axis actuator) are disposed in the in-plane motion motor 7031 with an arrangement that the actuation directions of both of the two single-axis actuators 5 are vertical to each other and parallel to the surface of the image sensor 7020, the first single-axis actuator 5 can cause the image sensor 7020 disposed on the lead frame 7032 to move with a distance in a first direction (say, in the X-direction), and the second single-axis actuator 5 can cause the image sensor 7020 disposed on the movable inner frame 4 to move with a distance in a second direction (say, in the Y-direction), For taking the image having a solution higher than 640×480, the image sensor 7020 is firstly positioned at its original position (i.e. at a coordinate of (0,0) in a Cartesian coordinate system) without being actuated by the single-axis actuator 7020, a first raw image is sensed and taken. After that, the image sensor 7020 is moved by the first single-axis actuator 5 in the first direction (say, in the positive X-direction) with a distance being 1/N (wherein N=2) of the pixel pitch, in this case the distance is 6 micrometers, and a second raw image is sensed and taken. The first and the second raw images have a 6 micrometers shift therebetween in the X-direction accordingly. Then, the image sensor 7020 is moved by the second single-axis actuator 5 in the second direction (say, in the positive Y-direction) with a distance being 6 micrometers, and a third raw image is sensed and taken. The second and the third raw images have a 6 micrometers shift therebetween in the Y-direction accordingly. At last, the first single-axis actuator 5 is released and the image sensor 7020 is moved by a resilient spring (not shown in FIGS. 7 and 8) disposed opposite to the first single-axis actuator 5 in the reversed first direction (say, in a minus X-direction) with a distance being 6 micrometers, and a fourth raw image is taken. The third and the fourth raw images have a 6 micrometers shift therebetween in the X-direction, and the fourth and the first raw images have also a 6 micrometers shift therebetween in the Y-direction accordingly. The first, the second, the third and the fourth raw images can be synthesized into a higher resolution image having a resolution of 1280×960, which is 4 times as that of 640×480. If N is 3, 9 raw images in total are taken and can be synthesized into a higher resolution image having a resolution of 1920×1440, which is 9 times as that of 640×480. If N is 12, the distance of each move of the image sensor is 1 micrometer, and the resolution of the target image taken will be 144 times of that of 640×480. Accordingly, N can be an integer larger than 1. Preferably, N is an integer and is a divisor (or a factor) in mathematics of the pixel pitch of the sensing pixels of the image sensor 7020. Accordingly, each shift of the image sensor 7020, i.e. each distance that the image sensor 7020 is moved by the single-axis actuator 5, is in a micrometer scale or even in a sub-micrometer scale that is 1/N of the pixel pitch of the sensing pixels of the image sensor 7020.

For an advanced and precise control of the movement of the image sensor 7020, the in-plane motion motor 7031 can have a third single-axis actuator 5 opposite to the first single-axis actuator 5 to cause the image sensor 7020 to move in the reverse X-direction, and a fourth single-axis actuator 5 opposite to the first single-axis actuator 5 to cause the image sensor 7020 to move in the reverse Y-direction.

Type 2: The Image Capturing Device Using an in-Plane Motion Motor Including at Least One Hinge-Sensing-Driving Unit/Single-Axis Actuator for a Modularized Design The in-plane motion motor can has a modularized design (Type 2) different from the customer-oriented design (Type 1) as described above.

Figure 18A:
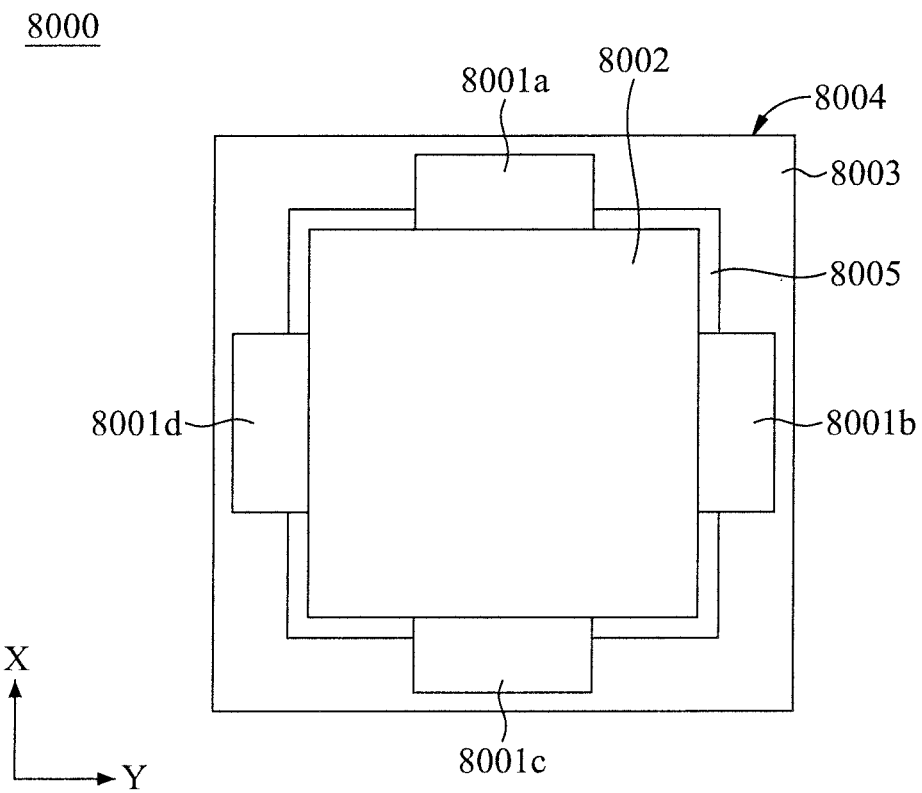
FIG. 18A is a top view of an image capturing device according to another embodiment of the present invention.
Figure 18B:
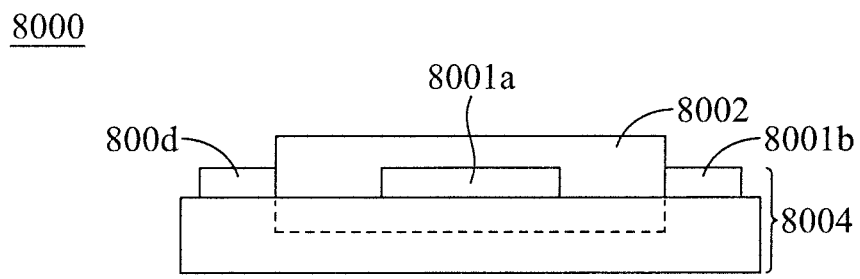
FIG. 18B is a side view of the image capturing device shown in FIG. 18A.

FIG. 18A is a top view of an image capturing device 8000 according to another embodiment of the present invention. FIG. 18B is a side view of the image capturing device shown in FIG. 18A. As shown in FIGS. 18A and 18B, the image capturing device includes an image sensor 8002, and an in-plane motion motor 8004. The in-plane motion motor 8004 includes a second circuit board 8003 of a frame shape and having a second central cavity 8005 for accommodating the image sensor 8002 therein, and at least a first hinge-sensing-driving unit 8001a configured to move the image sensor 8002 in a first direction (i.e. in the X-direction) inside the second central cavity. The first hinge-sensing-driving unit 8001a is disposed between the second circuit board 8003 and the image sensor 8002. For example, the first hinge-sensing driving unit 8001a is fixed on one side of the second circuit board surface of the second circuit board 8003 and connects to one lateral surface of the image sensor 8002. The second circuit board has a second metal routing and plural second metal pads disposed on the second circuit board surface. The first hinge-sensing-driving unit 8001*a* has a structure similar to that of the single-axis actuator 6001. Although the two terms, i.e. the first image-sensing-driving unit 8001*a* and the single-axis actuator 6001*a*, are named differently in the context for easily understanding, however, accordingly to another embodiment of the present invention, the first hinge-sensing-driving unit 8001*a* can be replaced by the single-axis actuator 6001.

In case that there is only one hinge-sensing-driving unit, i.e. the first hinge-sensing-driving unit 8001*a*, the first hinge-sensing-driving unit 8001*a* can cause the image sensor 8002 to move with a distance in a first direction (say, in the X-direction) parallel to the surface of the image sensor. For taking the image having a resolution higher than 640×480, the image sensor 8002 is positioned at its original position (i.e. at a coordinate of (0,0) in a Cartesian coordinate system) without being actuated by the first hinge-sensing-driving unit 8001*a* in the in-plane motion motor 8004, and a first raw image is sensed and taken by the image sensor 8002. After that, the image sensor 8002 is moved by the first hinge-sensing-driving unit 8001*a* in the first direction (say, in the X-direction) with a distance being 1/N (wherein N=2) of the pixel pitch, in this case, the distance being 6 micrometers, and a second raw image is sensed and taken by the image sensor 8002. The first and the second raw images, both having a 6 micrometers shift therebetween accordingly, can be synthesized into a higher resolution image having a resolution of 1280×480, which resolution is two times as that of 640×480. If N is 3, 3 raw images in total are taken and can be synthesized into a higher resolution image having a resolution of 1920×480, which is three times as that of 640×480. A controller configured to synthesize the plurality of the taken raw images into the higher resolution image is required in the present invention.

In case that two hinge-sensing-driving units (i.e. the first hinge-sensing-driving unit 8001*a* and the second hinge-sensing-driving unit 8001*b*) are used and arranged so that the actuation directions of both of the two hinge-sensing-driving units 8001*a* and 8001*b* are vertical to each other and parallel to the surface of the image sensor 8002, the first hinge-sensing-driving unit 8001*a* can cause the image sensor 8002 to move with a distance in a first direction (say, in the X-direction), and the second hinge-sensing-driving unit 8001*b* can cause the image sensor 8002 to move with a distance in a second direction (say, in the Y-direction). For taking the image having a solution higher than 640×480, the image sensor 7020 is firstly positioned at its original position (i.e. at a coordinate of (0,0) in a Cartesian coordinate system) without being actuated by the hinge-sensing-driving units 8001*a* and 8001*b*, and a first raw image is sensed and taken. After that, the image sensor 8002 is moved by the first hinge-sensing-driving unit 8001*a* in the first direction (say, in the positive X-direction) with a distance being 1/N (wherein N=2) of the pixel pitch; in this case, the distance is 6 micrometers, and a second raw image is sensed and taken. The first and the second raw images have a 6 micrometers shift therebetween in the X-direction accordingly. Then the image sensor 8002 is moved by the second hinge-sensing-driving unit 8001*b* in the second direction (say, in the positive Y-direction) with a distance being 6 micrometers, and a third raw image is sensed and taken. The second and the third raw images have a 6 micrometers shift therebetween in the Y-direction accordingly. At last, the first hinge-sensing-driving unit 8001*a* is released and the image sensor 8002 is moved by a resilient spring (not shown) disposed opposite to the first hinge-sensing-driving unit 8001*a* in the reversed first direction (say, in a minus X-direction) with a distance being 6 micrometers, and a fourth raw image is taken. The third and the fourth raw images have a 6 micrometers shift therebetween in the Y-direction, and the fourth and the first raw images have also a 6 micrometers shift therebetween in the X-direction accordingly. The first, the second, the third and the fourth raw images can be synthesized into a higher resolution image having a resolution of 1280×960, which is 4 times that of 640×480. If N is 3, 9 raw images in total are taken and can be synthesized into a higher resolution image having a resolution of 1920×1440, which is 9 times that of 640×480. If N is 12, the distance of each move of the image sensor is 1 micrometer, and the resolution of the target image taken will be 144 times that of 640×480. Accordingly, N can be an integer larger than 1. Preferably, N is an integer and is a divisor (or a factor) in mathematics of the pixel pitch of the sensing pixels of the image sensor 8002. Accordingly, each shift of the image sensor 8002, i.e. each distance that the image sensor 8002 is moved by the first or the second hinge-sensing-driving unit 8001*a* or 8001*b*, is in a micrometer scale or even in a sub-micrometer scale that is 1/N of the pixel pitch of the sensing pixels of the image sensor 7020.

For an advanced and precise control of the movement of the image sensor 8002, the in-plane motion motor 7031 can have a third hinge-sensing-driving unit 8001*c* opposite to the first hinge-sensing-driving unit 8001*a* to cause the image sensor 8002 to move in the reverse X-direction, and a fourth hinge-sensing-driving unit 8001*d* opposite to the first hinge-sensing-driving unit 8001*b* to cause the image sensor 8002 to move in the reverse Y-direction.

Figure 19:
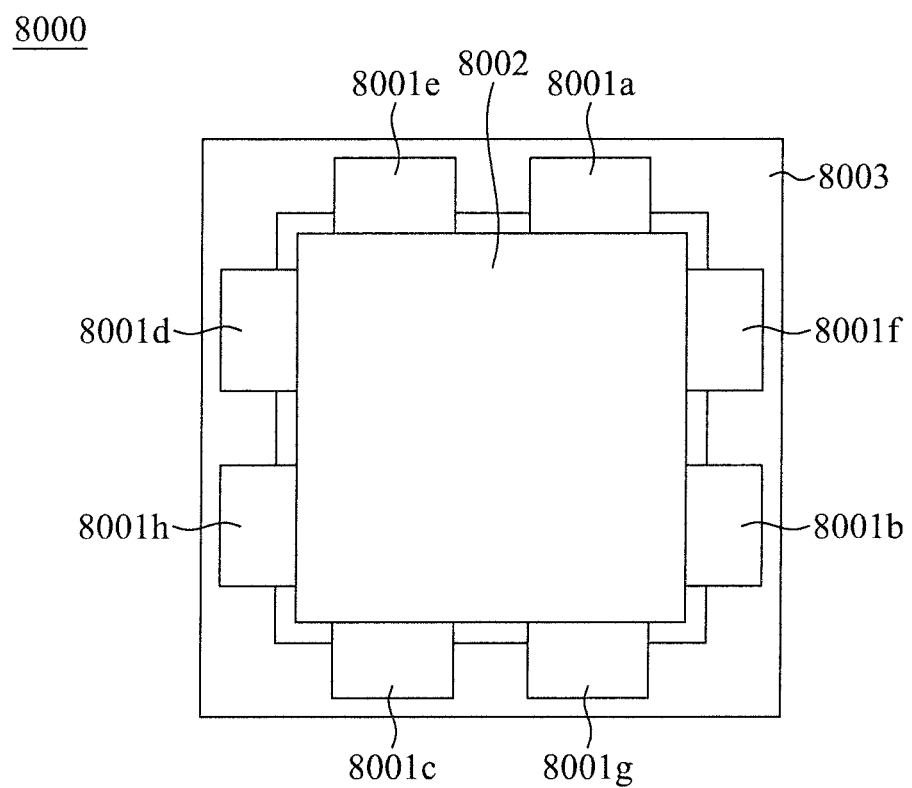
FIG. 19 is a top view of an image capturing device according to another embodiment of the present invention.

If the image sensor has a square shape but its side length is quite long so that one hinge—sensing-driving unit is not sufficient to cover the total length of the side length, two or more hinge—sensing-driving units can be disposed at each side of the image sensor. FIG. 19 is a top view of an image capturing device according to another embodiment of the present invention. As shown in FIG. 19, there are eight hinge-sensing-driving units 8001*a*-8001*h* in total, with every two of which disposed at each side of the square image sensor 8002. Similarly, if the image sensor has a rectangle shape having two shorter sides and two longer sides, a bigger amount of the hinge-sensing-driving units can be disposed on the longer sides than that on the shorter sides.

Figure 20:
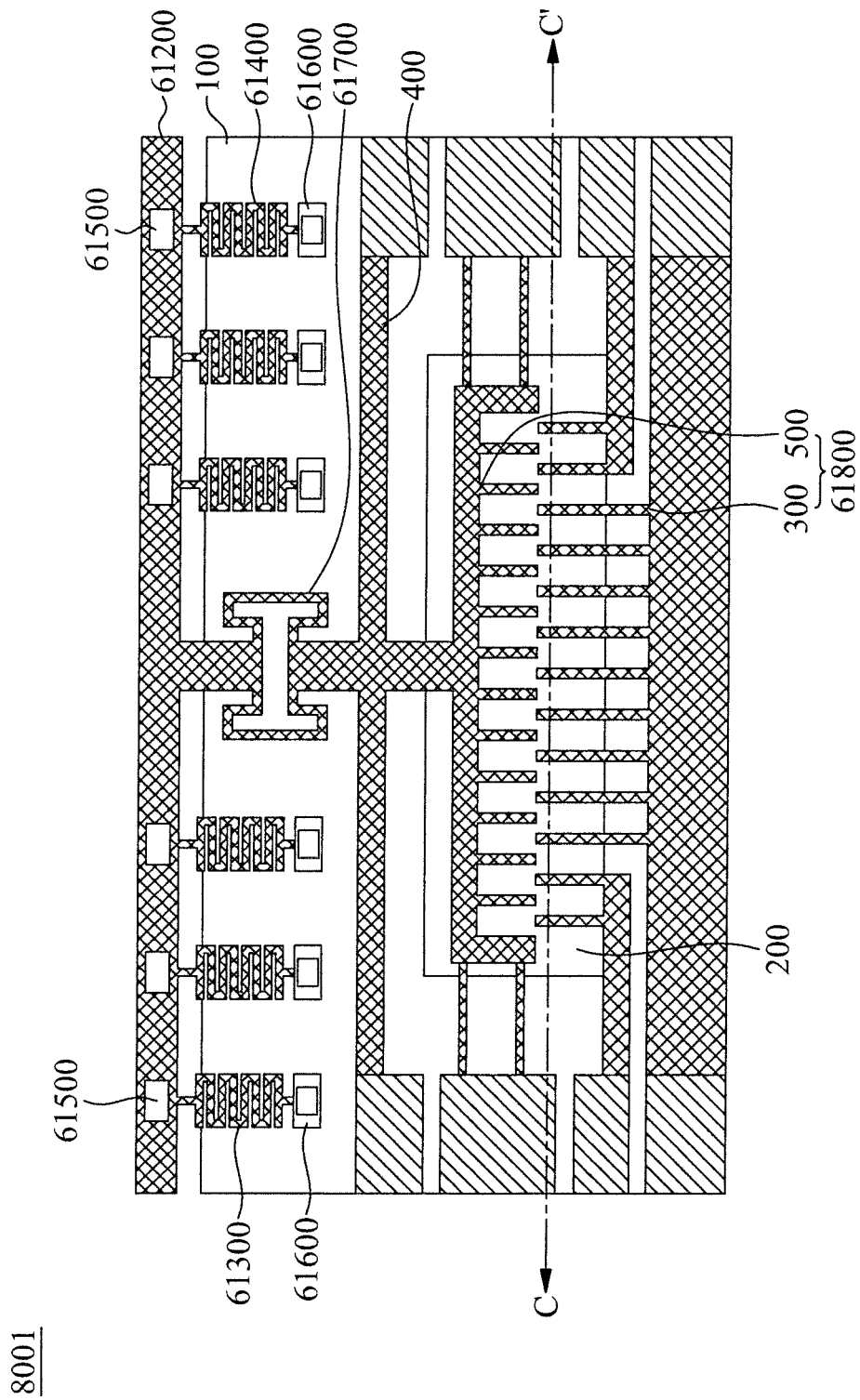
FIG. 20 is a schematic drawing showing a hinge-sensing-driving unit according to another embodiment of the present invention.
Figure 21:
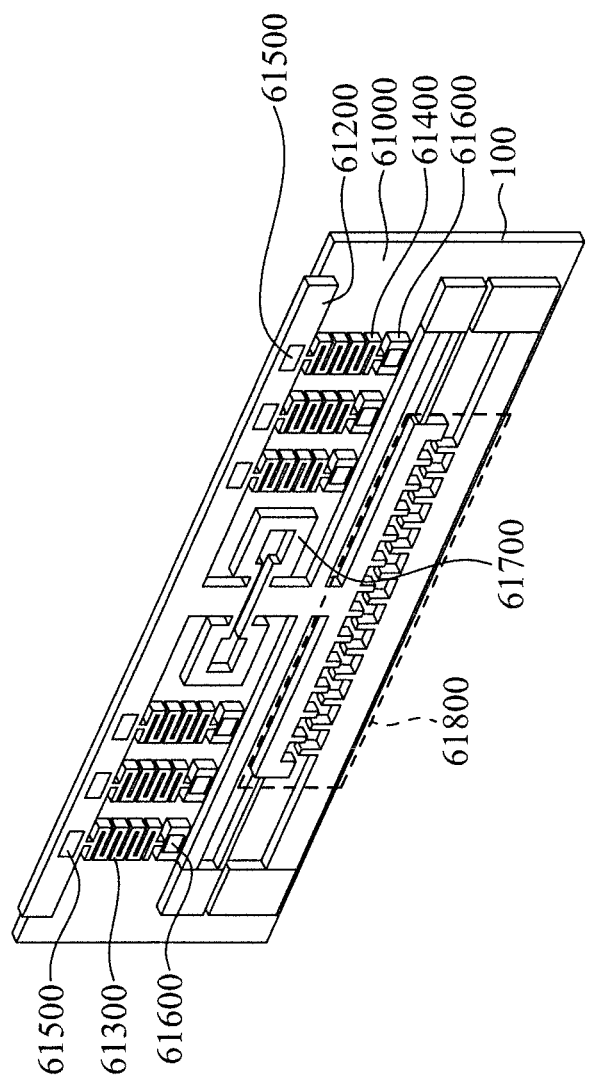
FIG. 21 is a prospective view of the hinge-sensing-driving unit shown in FIG. 20.

FIG. 20 is a schematic drawing showing a hinge-sensing-driving unit according to another embodiment of the present invention. FIG. 21 is a prospective view of the hinge-sensing-driving unit shown in FIG. 20. As shown in FIGS. 20 and 21, the hinge-sensing-driving unit 8001 has a structure different from the single-axis actuator 6001 in that the hinge-sensing-driving unit 8001 further includes at least one pair of resilient elements (three pairs of resilient elements are shown in FIGS. 20 and 21) connecting the actuating end 61200 and the substrate 100, which are a first resilient element 61300 and a second resilient element 61400. The first resilient element 61300 and the second resilient element 61400 are respectively disposed on the first side and the second side of the fulcrum hinge 61700. Each of the first resilient element 61300 and the second resilient element 61400 of the at least one pair of resilient elements includes a wire (figure not shown), wherein an end of the wire connects to a pad 61500 of the actuating end 61200, and an opposite end of the wire connects to a pad of a pad-anchor 61600 of the substrate 100. Therefore, the substrate 100, the first resilient element 61300, the second resilient element 61400 and the actuating end 61200 are electrically connected. In this embodiment, the actuating end 61200 is a T-bar, and the T-bar connects to the substrate 100 through the fulcrum hinge 61700 and the main hinge 400 having the first side and the second side. In a further embodiment, the hinge-sensing-driving unit 8001 does not have the main hinge.

The first resilient element 61300 and the second resilient element 61400 of the hinge-sensing-driving unit 8001 can be a soft spring, which does not provide the main rigid support. The first resilient element 61300 and the second resilient element 61400 of the hinge-sensing-driving unit 8001 can also be a material providing the rigid support. The stiffness of the first resilient element 61300 and the second resilient element 61400 are lower than that of the main hinge 400. Therefore, the first resilient element 61300 and the second resilient element 61400 can be used to generate a parametric characteristic of the hinge-sensing-driving unit 8001, such as an electrical or heat conductivity of the first resilient element 61300 and the second resilient element 61400, or a stiffness related to a vibrational response. For example, the first resilient element 61300 and the second resilient element 61400 conduct heat generated on the image sensor 8002 from the actuating end 61200 that contacts the image sensor 8002 to the substrate 100.

Figure 22:
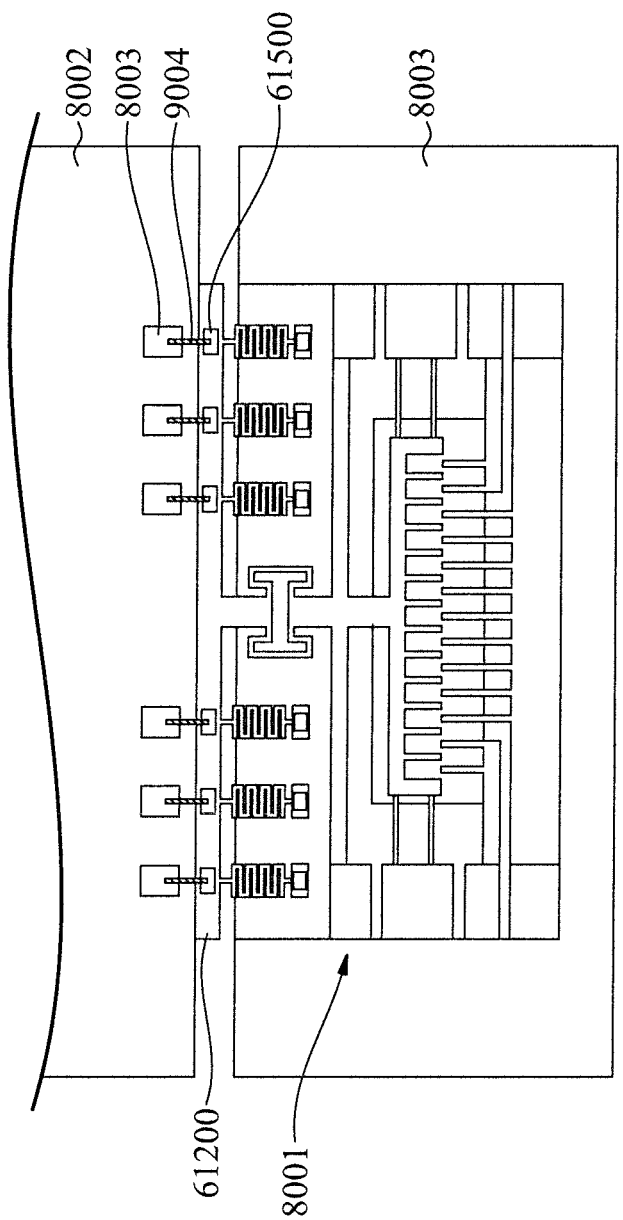
FIG. 22 is a schematic drawing showing the electrical connections between the hinge-sensing-driving unit and the image sensor according to an embodiment of the present invention.

FIG. 22 is a schematic drawing showing the electrical connections between the hinge-sensing-driving unit and the image sensor according to an embodiment of the present invention. As shown in FIG. 22, the pads on the image sensor 8002 and the respective pads 61500 on the actuating end 61200 of the hinge-sensing-driving unit 8001 are bonded by a wire 9004 for setting up the electrical connections between the image sensor 8002 and the hinge-sensing-driving unit 8001.

Accordingly, the present invention also provides a method for manufacturing an image capturing device for forming a higher resolution image of an image target having in-plane motion with or without an out-of plane motion by a simple way of assembling the application device, the function device, the in-plane motion motor and the out-of-plane motion motors with assistance of a proper jig. The in-plane motion provides a first set of three degrees of freedom, and the out-of-plane motion provides a second set of three degrees of freedom differing from the first set of three degrees of freedom.

While the present disclosure has been described in terms of what is presently considered to be the most practical and preferred embodiments, it is to be understood that the present disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. An image capturing device for forming a higher resolution image of an image target having a plurality of pixel areas respectively, comprising:
   an image sensor having a plurality of sensing pixels corresponding to the plurality of pixel areas respectively;
   an in-plane motion motor coupled to the image sensor, and configured to cause the image sensor to take a plurality of raw images related to the image target one by one, wherein the in-plane motion motor includes a circuit board, a central cavity disposed thereon and a single-axis actuator disposed between the circuit board and the image sensor, wherein the circuit board has a circuit board surface, and a metal routing and plural metal pads are disposed on the circuit board surface; and
   a controller configured to synthesize the plurality of raw images into the higher resolution image, wherein:
   the image sensor has a sensor surface;
   the single-axis actuator of the in-plane motion motor incrementally moves a plurality of times the image sensor inside the central cavity, each time with a distance equal to 1/N of a pixel pitch of one of the plurality of sensing pixels, along a first direction parallel to the sensor surface to respectively capture the plurality of raw images for forming the higher resolution image; and
   N is a positive integer being larger than 1.

2. The image capturing device according to claim 1, wherein the distance is in a scale of being from sub-micrometers to micrometers.

3. The image capturing device according to claim 1, further comprising a filter allowing a light having wavelengths within a predetermined range to pass therethrough, wherein the image sensor is disposed between the filter and the in-plane motion motor and senses the light passing through the filter to capture the plurality of raw images.

4. The image capturing device according to claim 3, wherein the wavelengths are within one of a visible light and an infrared light ranges.

5. The image capturing device according to claim 1, wherein the circuit board is a second circuit board, the central cavity is a second central cavity, the circuit board surface is a second circuit board surface, and the in-plane motion motor includes:
   a first circuit board having a first circuit board surface and including a first bottom base disposing thereon a first circuit board frame, wherein the first bottom base has a first set of four corners and a first central cavity with four notches facing toward the first set of four corners respectively, and a first metal routing and plural first metal pads are disposed on the first circuit board surface;
   a lead frame having a second set of four corners having four linkages respectively, each of which is welded to a respective one of the four notches when the lead frame is disposed inside the first central cavity; and
   an in-plane motion actuator having the single-axis actuator disposing thereon the image sensor.

6. The image capturing device according to claim 5, wherein the image sensor is mounted on the movable inner frame.

7. The image capturing device according to claim 5, wherein the in-plane motion motor further includes a connecting element connecting the movable inner frame and the fixed outer frame, and the connecting element is one of a set of soft electrical linkages providing a mechanical and an electrical connections and a flexible circuit board providing a mechanical, an electrical connection and a thermal connections.

8. The image capturing device according to claim 5, wherein the in-plane motion actuator includes:
   a substrate having thereon a fixed outer frame, a fixing portion, and a movable inner frame, the movable inner frame disposing thereon the image sensor, surrounded by the fixed outer frame and connected to the fixing portion of the substrate through a resilient element, wherein the single-axis actuator includes a first set of movable comb fingers connected to the movable inner frame, and a first set of fixed comb fingers connected to the fixing portion, and wherein the movable inner frame is moved along the first direction by a first movement of the first set of movable comb fingers with respect to the first set of fixed comb fingers.

9. The image capturing device according to claim 8, wherein the single-axis actuator serves as a first actuator, the in-plane motion actuator further includes a second actuator including a second set of movable comb fingers and a second set of fixed comb fingers connected to the fixed support, and the movable inner frame is moved along a second direction perpendicular to the first direction by a second movement of the second set of movable comb fingers with respect to the second set of fixed comb fingers.

10. The image capturing device according to claim 9, wherein the in-plane motion actuator further includes a third and a fourth actuators including respectively a third and a fourth sets of movable comb fingers disposed on the movable inner frame and respectively a third and a fourth sets of fixed comb fingers connected to the fixing portion, and the movable inner frame is moved along the first direction by a third movement of the third set of movable comb fingers and along the second direction by a fourth movement of the fourth set of movable comb fingers.

11. The image capturing device according to claim 1, wherein the single-axis actuator is a first single-axis actuator, and the image capturing device further comprises a second single-axis actuator configured to move the image sensor in a second direction perpendicular to the first direction, and disposed between the second circuit board and the image sensor.

12. The image capturing device according to claim 1, further comprising an out-of-plane motion motor disposed under the in-plane motion motor to actuate an out-of-plane motion to the image sensor.

13. The image capturing device according to claim 1, wherein the controller further controls an actuation of the in-plane motion motor to move the image sensor.

14. An image capturing device for capturing a plurality of raw images for forming a higher resolution image of an image target, comprising:
an image sensor having a plurality of sensing pixels having a pixel pitch, and configured to capture the plurality of raw images; and
an in-plane motion motor including a circuit board, a central cavity disposed thereon and a single-axis actuator, wherein the circuit board has a circuit board surface, a metal routing and plural metal pads are disposed on the circuit board surface, and the single-axis actuator is configured to:
cause the image sensor to incrementally move a plurality of times in a direction inside the central cavity, each time with a distance equal to 1/N of the pixel pitch and to capture the plurality of raw images one by one, wherein N is a positive integer being larger than 1, wherein the single-axis actuator is disposed between the circuit board and the image sensor.

15. The image capturing device according to claim 14, wherein the image sensor has a sensor surface, and the single-axis actuator of the in-plane motion motor incrementally moves the image sensor in a scale of being from sub-micrometers to micrometers along the direction parallel to the sensor surface to capture the plurality of raw images for forming the target image.

16. The image capturing device according to claim 14, further comprising a filter allowing a light having wavelengths within a predetermined range to pass therethrough, wherein the image sensor is disposed between the filter and the in-plane motion motor and senses the light passing through the filter to capture the plurality of raw images.

17. The image capturing device according to claim 14, wherein the in-plane motion motor includes an in-plane motion actuator, and the in-plane motion actuator includes:
a substrate having thereon a fixed outer frame, a fixing portion, and a movable inner frame, the movable inner frame disposing thereon the image sensor, surrounded by the fixed outer frame and connected to the fixing portion of the substrate through a resilient element, wherein the single-axis actuator includes a first set of movable comb fingers disposed on the movable inner frame and a first set of fixed comb fingers connected to a fixing portion, wherein the movable inner frame is moved along the direction parallel to the sensor surface by a first movement of the first set of movable comb fingers with respect to the first set of fixed comb fingers.

18. A method of capturing a plurality of raw images for forming a higher resolution image of an image target, comprising:
providing an image sensor having a plurality of sensing pixels having a pixel pitch;
causing the image sensor to capture a first one of the plurality of raw images of the image target;
providing a circuit board having a circuit board surface;
disposing a metal routing and plural metal pads on the circuit board surface;
disposing a central cavity on the circuit board;
providing a single-axis actuator; and
respectively capturing the other ones of the plurality of raw images by using the single-axis actuator to sequentially move the image sensor incrementally in a direction inside the second central cavity, each time with a distance equal to 1/N of the pixel pitch, wherein N is a positive integer being larger than 1, wherein the single-axis actuator is disposed between the circuit board and the image sensor.

19. The method according to claim 18, wherein the plurality of raw images are taken by an image capturing device, and the image capturing device comprises:
the image sensor having a sensor surface; and
an in-plane motion motor having the single-axis actuator, wherein the single-axis actuator incrementally moves the image sensor in a scale of being from sub-micrometers to micrometers along the direction parallel to the sensor surface to capture the plurality of raw images for forming the image target.

* * * * *